US012603016B2

(12) United States Patent
Tanigawa et al.

(10) Patent No.: US 12,603,016 B2
(45) Date of Patent: Apr. 14, 2026

(54) WEARABLE TERMINAL, PRESENTATION METHOD, AND RECORDING MEDIUM

(71) Applicant: Panasonic Intellectual Property Corporation of America, Torrance, CA (US)

(72) Inventors: Risako Tanigawa, Kanagawa (JP); Tatsumi Nagashima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 18/768,568

(22) Filed: Jul. 10, 2024

(65) Prior Publication Data

US 2024/0363018 A1 Oct. 31, 2024

Related U.S. Application Data

(63) Continuation of application No. PCT/JP2022/044252, filed on Nov. 30, 2022.

(30) Foreign Application Priority Data

Jan. 27, 2022 (JP) ................................. 2022-010867

(51) Int. Cl.
*G09B 5/06* (2006.01)
*G06F 3/01* (2006.01)
(52) U.S. Cl.
CPC ............... *G09B 5/06* (2013.01); *G06F 3/013* (2013.01)
(58) Field of Classification Search
CPC ..... G09B 19/24; G09B 21/009; G09B 21/006
See application file for complete search history.

(56) References Cited

U.S. PATENT DOCUMENTS

| | | | |
|---|---|---|---|
| 2016/0209916 A1 | 7/2016 | Sendai et al. | |
| 2023/0267812 A1 | 8/2023 | Nakagawa et al. | |
| 2024/0187562 A1 * | 6/2024 | Ito ........................... | G06F 3/011 |

FOREIGN PATENT DOCUMENTS

| | | | | |
|---|---|---|---|---|
| JP | 2016-130985 | 7/2016 | | |
| JP | 2018-180090 | 11/2018 | | |
| JP | 6492673 | 4/2019 | | |
| JP | 6584721 | 10/2019 | | |
| WO | WO-2019230687 A1 * | 12/2019 | .......... | G01P 15/0891 |
| WO | 2020/021589 | 1/2020 | | |
| WO | 2022/014274 | 1/2022 | | |

OTHER PUBLICATIONS

International Search Report (ISR) issued on Feb. 7, 2023 in International (PCT) Application No. PCT/JP2022/044252.

* cited by examiner

*Primary Examiner* — Robert J Utama
(74) *Attorney, Agent, or Firm* — Wenderoth, Lind & Ponack, L.L.P.

(57) ABSTRACT

A wearable terminal is a wearable terminal that can be worn by a user, and includes: an image obtainer that obtains an image of a subject appearing in a field of view of the user; a sound obtainer that obtains sound information including a sound occurring in a vicinity of the wearable terminal and a direction of occurrence of the sound; a specifier that, based on the sound information and the image, specifies a point of interest, the point of interest being a location, in the subject, where a sound in a predetermined band included in the sound has occurred; and a presenter that presents, to the user, an object indicating the point of interest.

12 Claims, 16 Drawing Sheets

| Type of anomaly in subject | Predetermined band (frequency band significantly different from normal band) |
|---|---|
| Lifted tile | 5 ~ 25 kHz |
| Flaw in bearing | a ~ b kHz |
| Oil bubble burst | c ~ d kHz |
| Shape defect | e ~ f kHz |
| ... | ... |

(a)

P20 z1

(b) First time

P21 z1

B1

Obtained
sound
includes
sound in
predetermined
band (c) Second time

P22 z1

B2

Sound generated
at same location
as first time
includes sound in
predetermined
band (d) Third time

P23 z1

B3

Sound generated
at same location
as second time
includes sound in
predetermined
band (a)

P50

(b)

P51

When sound similar to sound generated at location that has already been sonically inspected is detected

E2

E1

(c)

P51

E2

E1

Line of sight

WEARABLE TERMINAL, PRESENTATION METHOD, AND RECORDING MEDIUM

CROSS REFERENCE TO RELATED APPLICATIONS

This is a continuation application of PCT International Application No. PCT/JP2022/044252 filed on Nov. 30, 2022, designating the United States of America, which is based on and claims priority of Japanese Patent Application No. 2022-010867 filed on Jan. 27, 2022. The entire disclosures of the above-identified applications, including the specifications, drawings and claims are incorporated herein by reference in their entirety.

FIELD

The present disclosure relates to a wearable terminal that can be worn by a user, and the like.

BACKGROUND

A work education system which uses a head-mounted wearable display is known (see PTL 1, for example). The work education system displays work actions including the line of sight, hand movements, and the like of a model worker in the wearable display to provide a learning worker ("user", hereinafter) with knowledge of the work actions.

CITATION LIST

Patent Literature

PTL 1: Japanese Unexamined Patent Application Publication No. 2018-180090

SUMMARY

Technical Problem

However, the work education system described in PTL 1 is not capable of presenting knowledge of auditory tasks to the learning worker.

Accordingly, the present disclosure provides a wearable terminal and the like capable of presenting knowledge of an auditory task to a user.

Solution to Problem

A wearable terminal according to one aspect of the present disclosure is a wearable terminal that can be worn by a user. The wearable terminal includes: an image obtainer that obtains an image of a subject appearing in a field of view of the user; a sound obtainer that obtains sound information including a sound occurring in a vicinity of the wearable terminal and a direction of occurrence of the sound; a specifier that, based on the sound information and the image, specifies a point of interest, the point of interest being a location, in the subject, where a sound in a predetermined band included in the sound has occurred; and a presenter that presents, to the user, an object indicating the point of interest.

Advantageous Effects

According to the present disclosure, a wearable terminal and the like can be provided which are capable of presenting knowledge of an auditory task to a user.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Overview of the Present Disclosure

Figure 1:
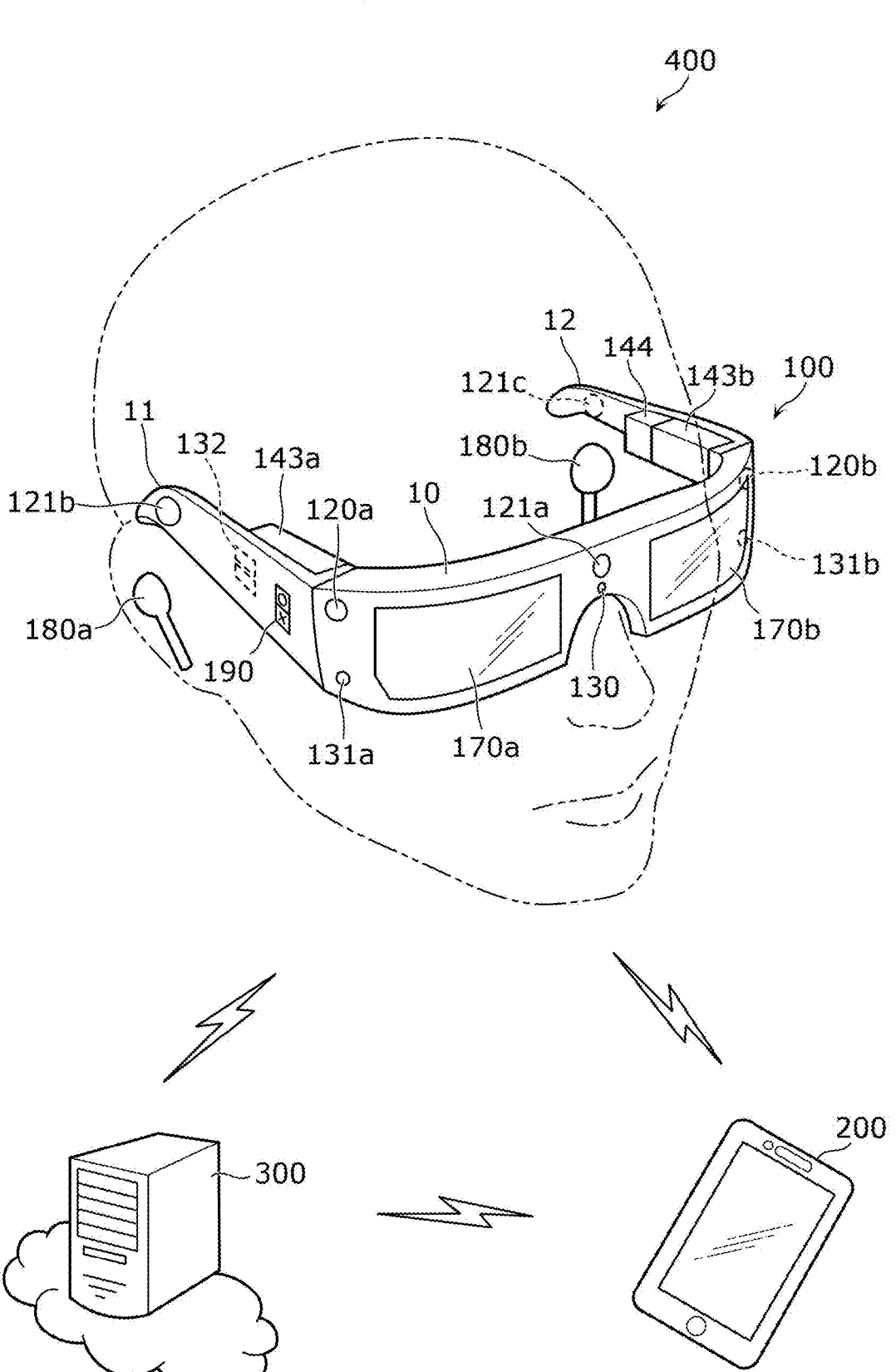
FIG. 1 is a diagram illustrating an overview of a presentation system according to Embodiment 1.

A wearable terminal according to one aspect of the present disclosure is a wearable terminal that can be worn by a user. The wearable terminal includes: an image obtainer that obtains an image of a subject appearing in a field of view of the user; a sound obtainer that obtains sound information including a sound occurring in a vicinity of the wearable terminal and a direction of occurrence of the sound; a specifier that, based on the sound information and the image, specifies a point of interest, the point of interest being a location, in the subject, where a sound in a predetermined band included in the sound has occurred; and a presenter that presents, to the user, an object indicating the point of interest.

Through this, the wearable terminal presents the user with an object indicating the location where the sound in the predetermined band has occurred in the subject appearing in the user's field of view (called a "point of interest"), which makes it easier for the user to understand how to distinguish the sound in the predetermined band. The wearable terminal can therefore present the knowledge of an auditory task to the user.

The wearable terminal according to one aspect of the present disclosure may further include a sound outputter that outputs the sound having increased a sound pressure of the sound in the predetermined band.

Through this, the wearable terminal outputs the sound in the predetermined band at a high sound pressure, which makes it possible to effectively present knowledge of the auditory task to the user.

In the wearable terminal according to one aspect of the present disclosure, when the sound in the predetermined band is determined to have occurred in a same point of interest, the presenter may present the object indicating the same point of interest to the user in a different presentation format.

Through this, when the sound in the predetermined band is determined to have occurred again at the same point of interest, the wearable terminal presents the object to the user in a different presentation format, which makes it easier for the user to recognize the sound in the predetermined band occurring at the same point of interest. The wearable terminal can therefore effectively present knowledge of auditory tasks to the user.

The wearable terminal according to one aspect of the present disclosure may further include a detector that detects a specific action by the user, and based on the specific action detected by the detector, the presenter may perform switching of a presentation format of the object indicating the point of interest, or may perform switching between presenting and not presenting the object indicating the point of interest.

Through this, the wearable terminal detects the specific action by the user and performs the switching of the presentation format of the object, or switching between presenting and not presenting, which makes it possible to adjust the presentation of the knowledge of the auditory task to the user according to the user's proficiency.

In the wearable terminal according to one aspect of the present disclosure, the specific action by the user may be an action of the user bringing two fingers together.

Through this, the wearable terminal can detect the action by the user bringing their fingers together as a specific action, which enables the user to operate the wearable terminal through simple actions while working.

In the wearable terminal according to one aspect of the present disclosure, the detector may further detect a line of sight of the user, and based on the line of sight of the user detected by the detector, the presenter may perform the switching for the object indicating the point of interest when the line of sight of the user is directed at the point of interest.

Through this, the wearable terminal detects the user's line of sight and determines the point of interest to which the user's line of sight is directed as the target of the presentation switch, which makes it possible to switch the presentation of the object for the point of interest to which the user's line of sight is directed when the specific action is detected. The wearable terminal can therefore switch the presentation of the object appropriately according to an instruction from the user.

In the wearable terminal according to one aspect of the present disclosure, in addition to the object indicating the point of interest currently specified by the specifier, the presenter may present, to the user, an other object indicating an other point of interest specified before the point of interest in the field of view of the user, and when, based on the line of sight of the user, the line of sight of the user is determined to be directed to the other point of interest, the sound outputter may output a sound in the predetermined band occurring at the other point of interest.

Through this, the wearable terminal can output a sound in a predetermined band generated at the other point of interest when the user's line of sight is directed to the other point of interest, and teach the user the sound in the predetermined band.

In the wearable terminal according to one aspect of the present disclosure, the detector may further detect a distance between the subject and the user, and when the distance detected by the detector exceeds a first threshold, the presenter may present, to the user, all instances of the object indicating all instances of the point of interest for a set past period.

Through this, the wearable terminal can present, to the user, where, on the subject, all the points of interest specified over a set period in the past are located, for example, in response to detecting that the user is at least a set distance from the subject.

The wearable terminal according to one aspect of the present disclosure may further include a controller that switches between presenting and not presenting the object by the presenter; when the object is set to not be presented, the controller may keep the object not presented when a specific sign detected by the detector as the specific action is determined to at least partially overlap with the point of interest specified by the specifier in the image, and may switch from not presenting the object to presenting the object when the specific sign is determined not to overlap with the point of interest in the image.

Through this, the wearable terminal does not present the object when the user has successfully identified the sound in the predetermined band, but presents the object when the user is unable to identify the sound in the predetermined band, which makes it possible for the user to confirm whether their determination is correct each time. The wearable terminal can therefore effectively train the user to identify sounds in the predetermined band.

In the wearable terminal according to one aspect of the present disclosure, when the specific sign is determined not to overlap with the point of interest a predetermined number of times consecutively, the controller may switch from not presenting the object to presenting the object.

Through this, the wearable terminal presents the object when the user is unable to identify the sound in the predetermined band for a predetermined number of times consecutively, which makes it possible to make a user who has undergone a certain amount of training aware that they have not successfully identified the sound in the predetermined band, for example.

In the wearable terminal according to one aspect of the present disclosure, when a reference point indicating a correct point of interest is prepared in advance, the controller may switch from not presenting the object to presenting the object when a percentage of times the specific sign is determined to overlap with the reference point is less than a second threshold.

Through this, the wearable terminal prepares a reference point indicating the correct point of interest in advance, and switches from not presenting the object to presenting the object when the user's proficiency in the auditory task is lower than a predetermined level. The wearable terminal can therefore effectively train the user for the auditory task.

The wearable terminal according to one aspect of the present disclosure may further include a controller that switches between presenting and not presenting the object by the presenter; when the object is set to not be presented, the controller may keep the object not presented when a movement trajectory, detected by the detector, of a striking implement used by the user for sonically inspecting the subject overlaps with the point of interest specified by the specifier in the image fewer than a predetermined number of times, and may switch from not presenting the object to presenting the object when the movement trajectory of the striking implement overlaps with the point of interest in the image at least a predetermined number of times.

Through this, when the movement trajectory of the striking implement used by the user and the point of interest do not overlap at least a predetermined number of times, the wearable terminal determines that the user is able to accurately identify the sound in the predetermined band to a certain extent, and keeps the object not presented. When the movement trajectory of the striking implement used by the user and the point of interest overlap at least a predetermined number of times, the wearable terminal determines that the user is not able to accurately identify the sound in the predetermined band, and presents the object. The wearable terminal therefore switches the object from not being presented to being presented when the user's proficiency is lower than a predetermined level, which makes it possible to switch the display of the object according to the user's proficiency.

A presentation method according to one aspect of the present disclosure is a presentation method executed by a wearable terminal that can be worn by a user. The presentation method includes: obtaining an image of a subject appearing in a field of view of the user; obtaining sound information including a sound occurring in a vicinity of the wearable terminal and a direction of occurrence of the sound; specifying, based on the sound information and the image, a point of interest, the point of interest being a location, in the subject, where a sound in a predetermined band included in the sound has occurred; and presenting, to the user, an object indicating the point of interest.

Through this, a device that executes the presentation method, such as a wearable terminal, presents the user with an object indicating the location where the sound in the predetermined band has occurred in the subject appearing in the user's field of view (called a "point of interest"), and can therefore teach the user how to distinguish the sound in the predetermined band. The device that executes the presentation method, such as the wearable terminal, can therefore present the knowledge of an auditory task to the user.

Additionally, a program according to one aspect of the present disclosure is a program that causes a computer to execute the above-described presentation method.

Through this, the same effects as those of the above-described presentation method can be achieved using a computer.

Note that these comprehensive or specific aspects may be realized by a system, a method, a device, an integrated circuit, a computer program, or a computer-readable recording medium such as a Compact Disc Read Only Memory (CD-ROM), or may be implemented by any desired combination of systems, methods, devices, integrated circuits, computer programs, and recording media.

Embodiments of the present disclosure will be described in detail hereinafter with reference to the drawings. The numerical values, shapes, materials, constituent elements, arrangements and connection states of constituent elements, steps, orders of steps, and the like in the following embodiments are merely examples, and are not intended to limit the scope of the claims. Additionally, of the constituent elements in the following embodiments, constituent elements not denoted in the independent claims, which express the broadest interpretation, will be described as optional constituent elements. Additionally, the drawings are not necessarily exact illustrations. Configurations that are substantially the same are given the same reference signs in the drawings, and redundant descriptions may be omitted or simplified.

Additionally, in the present disclosure, terms indicating relationships between elements, such as "parallel" and "perpendicular", terms indicating the shapes of elements, such as "rectangular", and numerical values do not express the items in question in the strictest sense, but rather include substantially equivalent ranges, e.g., differences of several percent, as well.

Embodiment 1

Embodiment 1 will be described in detail hereinafter with reference to the drawings.

1. Overview

Figure 2:
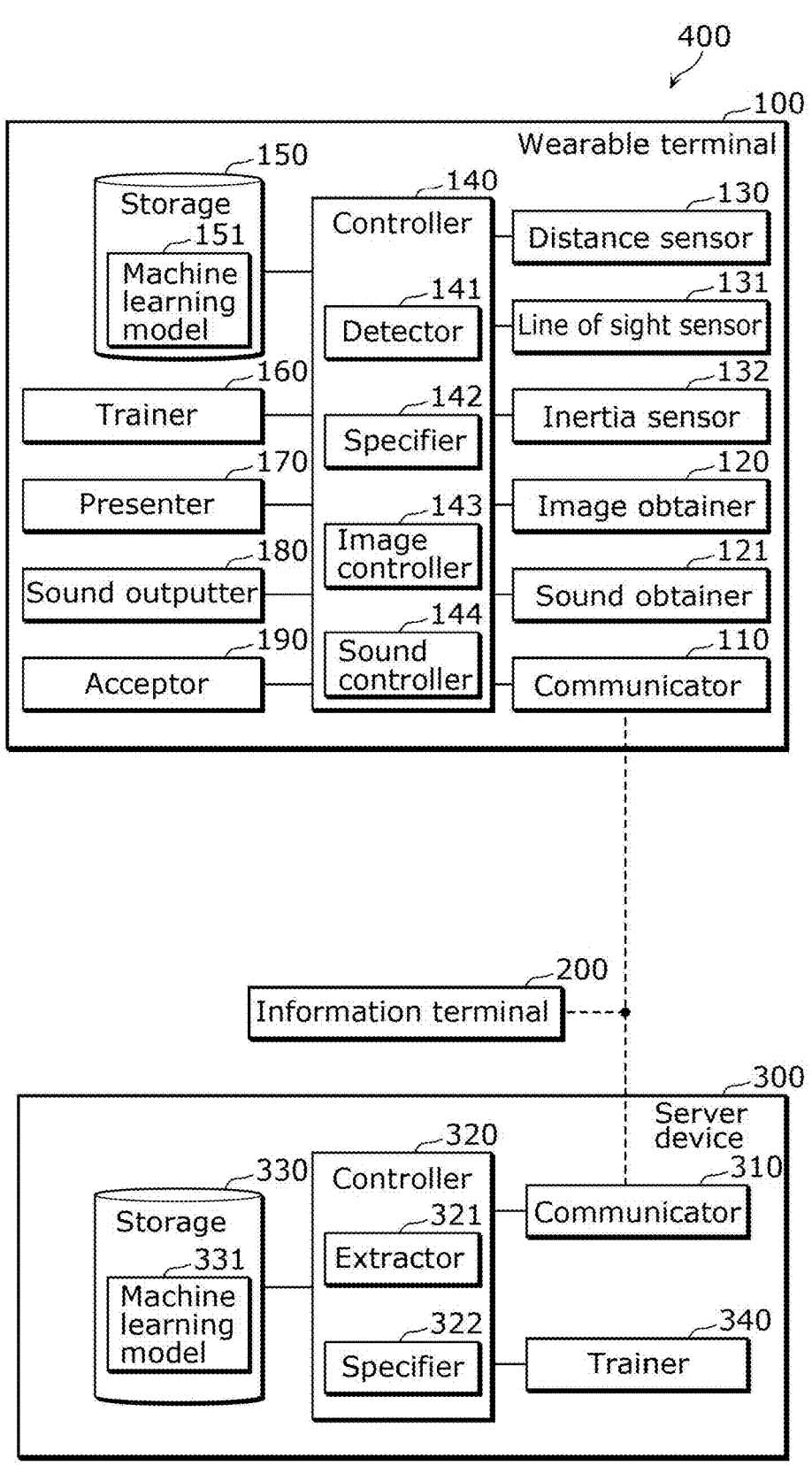
FIG. 2 is a block diagram illustrating an example of the configuration of the presentation system according to Embodiment 1.

First, an overview of a presentation system including a wearable terminal according to Embodiment 1 will be described with reference to FIG. 1. FIG. 1 is a diagram illustrating an overview of the presentation system according to Embodiment 1. FIG. 2 is a block diagram illustrating an example of the configuration of the presentation system according to Embodiment 1.

As illustrated in FIGS. 1 and 2, presentation system 400 according to Embodiment 1 includes wearable terminal 100, information terminal 200, and server device 300. Presentation system 400 is a system used, for example, to present knowledge of an auditory task by a model worker to a learning worker to improve the proficiency of the learning worker.

Information terminal 200 may be used to relay communication between wearable terminal 100 and server device 300, or may be used as a controller of wearable terminal 100. In other words, information terminal 200 may perform information processing performed by controller 140 of wearable terminal 100. This makes it possible to reduce the amount of processing, which in turn makes it possible to reduce the size of wearable terminal 100.

Server device 300 is what is known as a cloud server. Server device 300 holds auditory task data of a model worker, data in which a type of an anomaly in an inspection subject ("subject" hereinafter) is associated with sound in a predetermined band occurring at the location of the anomaly in the subject (e.g., a database), various types of data necessary for training the learning worker, and the like. The subject is a subject for which the presence or absence of an anomaly is detected based on a sound generated when the subject is struck with a striking implement such as a sounding stick, for example.

2. Configuration

The configuration of presentation system 400 according to Embodiment 1 will be described next.

2-1. Wearable Terminal

As illustrated in FIG. 1, wearable terminal 100 is, for example, an eyeglass-type or a goggle-type wearable terminal. Wearable terminal 100 includes main body 10, right holding part 11, and left holding part 12. Right holding part 11 is provided so as to extend from a right-end part of main body 10 to a position corresponding to a side of the user's head. Left holding part 12 is provided so as to extend from a left-end part of main body 10 to a position corresponding to a side of the user's head.

In main body 10, for example, right presenter 170a and left presenter 170b, serving as presenter 170, are arranged so as to correspond to the right eye and the left eye of the user, respectively. As illustrated in FIG. 1, right presenter 170a may be controlled by right image controller 143a disposed in right holding part 11, and left presenter 170b may be controlled by left image controller 143b disposed in left holding part 12. Although FIG. 1 illustrates an example in which both right image controller 143a and left image controller 143b are provided as image controller 143, only one may be present.

Additionally, two cameras 120a and 120b, for example, are disposed in main body 10 as image obtainer 120 for obtaining an image of the user's field of view. In addition, for example, in main body 10, right eye line of sight sensor 131a and left eye line of sight sensor 131b are disposed as line of sight sensor 131 so as to correspond to the respective eyes of the user, and distance sensor 130 is disposed to measure a distance between wearable terminal 100 and the subject appearing in the user's field of view.

In addition, for example, as sound obtainer 121, microphone 121a is disposed in main body 10; furthermore, microphone 121b and microphone 121c are disposed in right holding part 11 and left holding part 12, respectively, to collect sound close to sounds audible to a worker. Although microphone 121a is disposed in main body 10 in FIG. 1, the configuration is not limited to this example, and two or more microphones may be disposed in main body 10, for example.

In addition, for example, inertia sensor 132 and power buttons (e.g., a circle as a power on button and an X as a power off button) as acceptor 190 are provided in right holding part 11, and sound controller 144 that controls sound outputter 180, such as earphones 180a and 180b, is provided in left holding part 12.

The functional configuration of wearable terminal 100 will be described next with reference to FIG. 2. As illustrated in FIG. 2, wearable terminal 100 includes, for example, communicator 110, image obtainer 120, sound obtainer 121, distance sensor 130, line of sight sensor 131, inertia sensor 132, controller 140, storage 150, trainer 160, presenter 170, sound outputter 180, and acceptor 190. In the following, descriptions of matters already described with reference to FIG. 1 will be omitted or simplified.

Communicator

Communicator 110 is communication circuitry (a communication module) for wearable terminal 100 to communicate with information terminal 200 and server device 300. Communicator 110 includes communication circuitry (a communication module) for communicating over a local communication network, but may include communication circuitry (a communication module) for communicating over a wide-area communication network. Communicator 110 is, for example, a wireless communicator that performs wireless communication. Note that the communication standard of the communication by communicator 110 is not particularly limited.

Image Obtainer

Image obtainer 120 obtains an image of a subject appearing in the field of view of the user. Specifically, image obtainer 120 is a camera. Image obtainer 120 may include, for example, one or more cameras 120a and 120b (see FIG. 1).

Sound Obtainer

Sound obtainer 121 obtains sound information including a sound occurring in the vicinity of wearable terminal 100 and a direction of occurrence of the sound. Specifically, sound obtainer 121 is a microphone. Sound obtainer 121 may include, for example, one or more microphones 121a, 121b, and 121c (see FIG. 1).

Distance Sensor

Distance sensor 130 is disposed, for example, in main body 10, and measures a distance between main body 10 of wearable terminal 100 and the subject appearing in the user's field of view. Distance sensor 130 may be constituted by an infrared camera and a laser, or may be constituted by a receiver that receives ultrasonic waves and an emitter that emits ultrasonic waves. Note that if image obtainer 120 is a stereo camera or a Time of Flight (ToF) camera, distance sensor 130 need not be provided separate from image obtainer 120.

Line of Sight Sensor

Line of sight sensor 131 detects line of sight information including the user's line of sight and retina. Specifically, line of sight sensor 131 includes right eye line of sight sensor 131a, which detects the line of sight of the user's right eye, and left eye line of sight sensor 131b, which detects the line of sight of the user's left eye. Line of sight sensor 131 may, for example, detect a non-moving part of the user's eye (e.g., an inner corner of the eye) as a reference point using well-known template matching, detect a moving part of the eye (e.g., the iris) as a moving point, and then detect the user's line of sight based on the positional relationship between the reference point and the moving point. Furthermore, line of sight sensor 131 may irradiate the user with infrared light from an infrared Light Emitting Diode (LED) or the like, detect a reference point (e.g., cornea reflection) and a moving point (e.g., a pupil) from image data generated by capturing an image of the user with the infrared camera, and then detect the user's line of sight based on the positional relationship between the reference point and the moving point.

Inertia Sensor

Inertia sensor 132 is a sensor that detects movement of the user's body (here, the head). Specifically, inertia sensor 132 is an accelerometer, an angular velocity sensor, or the like.

Controller

Controller 140 performs various types of information processing related to wearable terminal 100 based on the sound information, images, and sensing information obtained. Specifically, controller 140 includes detector 141, specifier 142, image controller 143, and sound controller 144. The functions of detector 141, specifier 142, image controller 143, and sound controller 144 are realized by a processor or microcomputer constituting controller 140 executing computer programs stored in storage 150.

For example, controller 140 switches between presenting and not presenting an object by presenter 170. More specifically, when the object is set not to be presented, controller 140 keeps the object not presented when, in the image, a specific sign detected by detector 141 as a specific action is determined to at least partially overlap with a point of interest, specified by specifier 142, where a sound in a predetermined band has occurred; and switches from not presenting the object to presenting the object when the specific sign is determined not to overlap with the point of interest in the image. At this time, when the specific sign is determined not to overlap with the point of interest a predetermined number of times (e.g., three times) consecutively, controller 140 may switch from not presenting the object to presenting the object; or, when a reference point indicating a correct point of interest is prepared in advance, controller 140 may switch from not presenting the object to presenting the object when a percentage of times the specific sign is determined to overlap with the reference point is less than a second threshold (e.g., 70%). Additionally, for example, when the object is set to not be presented, controller 140 may keep the object not presented when, in the image, a movement trajectory, detected by detector 141, of a striking implement used by the user for sonically inspecting the subject overlaps with a point of interest, specified by specifier 142, where a sound in a predetermined band has occurred, fewer than a predetermined number of times (e.g., three times); and may switch from not presenting the object to presenting the object when the movement trajectory of the striking implement overlaps with the point of interest at least the predetermined number of times (e.g., three times) in the image.

Detector

Detector 141 detects a specific action by the user. The specific action may be an action using a part of the user's body such as a hand, an arm, a finger, or an eye, an action using a tool such as a striking implement (e.g., a sounding stick, a hammer, or the like) used by the user, or a mark added to the subject using chalk, tape, or the like. For example, the specific action may be an action in which the user brings two fingers together (e.g., their index finger and thumb), swings one hand or arm from side to side, points with their fingertip, directs their line of sight, draws a "V" shape using the tip of a tool, draws a circle using the tip of a tool, swings the tip of the tool from side to side, draws a circle, a square, or an "X" on the subject using chalk, or the like. Detector 141 may detect the specific action based on at least one of an image obtained by image obtainer 120 and movement of the user's body (e.g., the head) detected by inertia sensor 132.

Detector 141 may further detect the user's line of sight. For example, detector 141 detects the user's line of sight based on line of sight information of the user detected by line of sight sensor 131.

Detector 141 may further detect a distance between the subject and the user. For example, detector 141 may detect the distance between the subject and the user based on sensing information obtained by image obtainer 120, inertia sensor 132, and distance sensor 130 (e.g., an image, movement of the user's head, and the distance between wearable terminal 100 and the subject).

Specifier

Based on sound information including a sound obtained by sound obtainer 121 and a direction of occurrence of the sound, and an image of a subject appearing in the user's field of view obtained by image obtainer 120, specifier 142 specifies a point of interest, which is a location in the subject where a sound in a predetermined band included in the sound has occurred. The sound in the predetermined band is a sound in a frequency band which is significantly different from a sound generated when the subject is caused to generate a sound while in a normal state. For example, when there is an anomaly in the subject, the sound pressure of the sound in the predetermined band will be higher or lower than the sound pressure in the normal state, or a sound in the predetermined band not present in the sound in the normal state will be present. Causing the subject to generate a sound may be, for example, generating a sound in the subject by applying an outside force to the subject, generating a sound in the subject by causing the subject to operate, or generating a sound through a phenomenon occurring inside the subject. For example, causing the subject to generate a sound is generating a sound in the subject by striking the subject with a striking implement. Detecting a sound in the predetermined band included in the sound is, for example, a sonic inspection, but is not limited thereto. Besides sonic inspections, for example, rotational sounds generated when a motor is rotated, operation sounds of a machine generated when a fan or a power tool is operated, and anomalous sounds in the popping sounds of air bubbles inside a liquid pump may be detected.

Image Controller

Image controller 143 performs various types of information processing on the image presented to the user by presenter 170. For example, image controller 143 outputs, to presenter 170, image information and control conditions derived based on a coordinate axis in the user's field of view and a coordinate axis for presenter 170 to present an image of an object superimposed on the subject appearing in the user's field of view (an augmented reality image).

Sound Controller

Sound controller 144 performs various types of information processing pertaining to the sound output by sound outputter 180. For example, when the sound in the predetermined band is specified by specifier 142, sound controller 144 outputs a control signal to sound outputter 180 to increase the sound pressure of the sound in the predetermined band.

Storage

Storage 150 is a storage device that stores a dedicated application program and the like for controller 140 to execute. Storage 150 may be implemented as a Hard Disk Drive (HDD), for example, but may be implemented as semiconductor memory. Storage 150 may store a database (not shown) and a trained machine learning model 151.

Figures 3, 4:
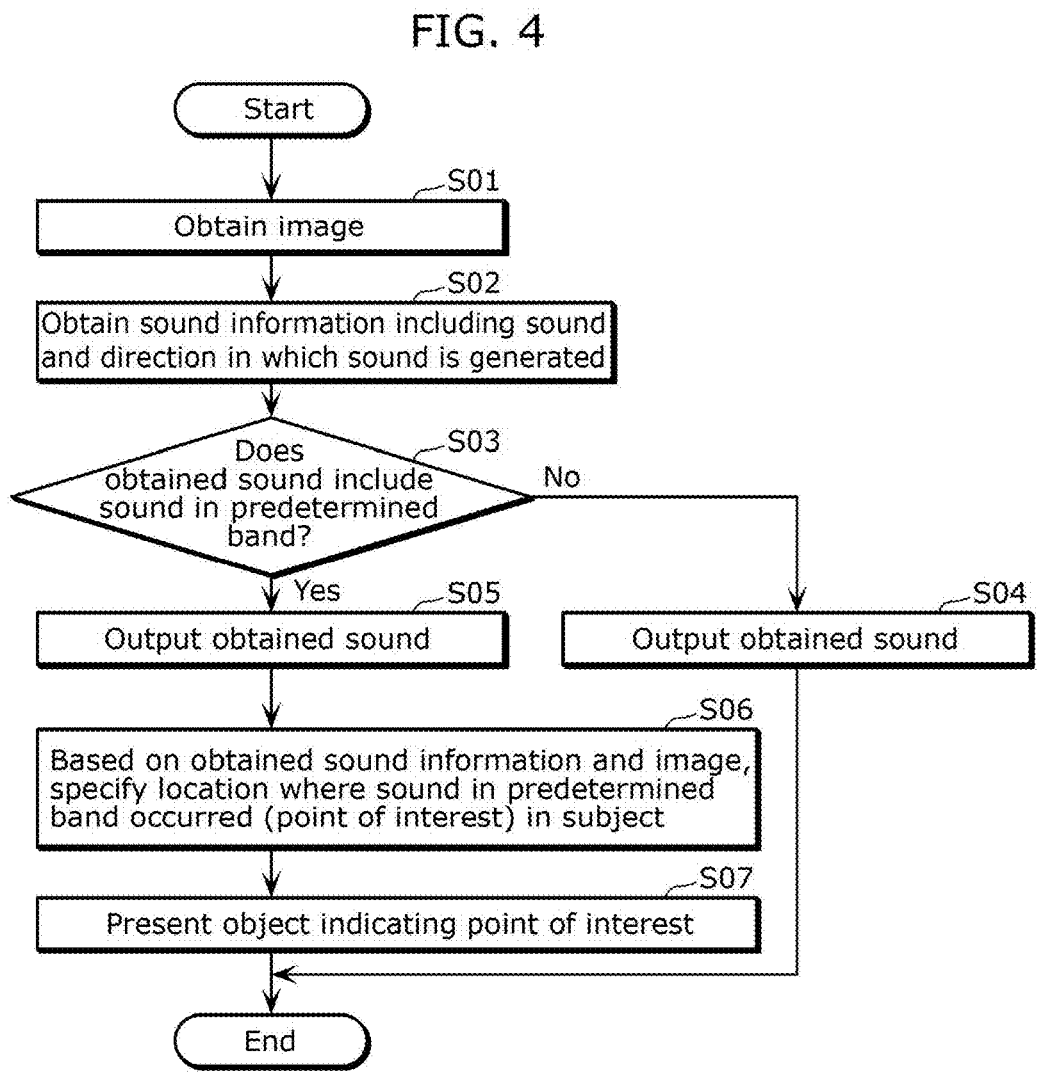
FIG. 3 is a diagram illustrating an example of a database.
FIG. 4 is a flowchart illustrating Example 1 of operations of the wearable terminal according to Embodiment 1.

FIG. 3 is a diagram illustrating an example of the database. As illustrated in FIG. 3, for example, the database registers types of anomalies in the subject in association with sounds in the predetermined band occurring at the location of the anomaly in the subject. For example, if the subject is tiling and the anomaly is a lifted tile, a significant difference compared to the sound when the tile is normal appears in the frequency band between 5 kHz and 25 kHz. Examples of anomalies in the subject here include flaws in the bearings of a machine, bursting of oil bubbles, shape defects, and the like, but other anomalies may also be registered in association with corresponding sounds in predetermined bands. Note that the database may be built by server device 300 and stored in storage 150 of wearable terminal 100. A method for building the database will be described later with reference to server device 300.

Machine Learning Model

Machine learning model 151 is used in the processing for specifying the sound in the predetermined band. Machine learning model 151 may be, for example, a Convolutional Neural Network (CNN), but is not limited thereto. For example, machine learning model 151 may be a fully-connected neural network. Additionally, if the sound information is time-series numerical data (e.g., time-series numerical data of a spectrogram of the sound or a frequency characteristic of the sound), machine learning model 151 may be a Recurrent Neural Network (RNN) model. In other words, machine learning model 151 may be selected as appropriate according to the format of the input data. Machine learning model 151 is obtained through training performed by trainer 160. Machine learning model 151 may be constructed, for example, by being trained on relationships between (i) the presence or absence of an anomaly and (ii) a sound generated by the subject by applying an outside force to the subject, a sound generated by the subject by causing the subject to operate, or a sound generated by a phenomenon inside the subject. More specifically, machine learning model 151 may be constructed, for example, by being trained on relationships between the presence or absence of an anomaly and a sound generated by the subject when the subject is struck by the striking implement. Note that the sound generated by the subject when the subject is struck by the striking implement is merely an example, and is not limited thereto.

Trainer

Trainer 160 trains the machine learning model. For example, trainer 160 may perform supervised training. In this case, trainer 160 may train the machine learning model using labeled data, or may train the machine learning model without using labeled data. For example, if trainer 160 trains the machine learning model using labeled data, the labeled data may include (i) first data constituted by sound information pertaining to sounds generated at a location where the subject is struck by the striking implement and an annotation indicating an anomaly of the subject, and (ii) second data constituted by the sound information and an annotation indicating there is no anomaly in the subject (i.e., the subject is normal). If trainer 160 trains the machine learning model without using labeled data, the data used for the training is, for example, sound information pertaining to sounds generated at the location where the subject is struck by the striking implement. Note that the sound information is merely an example, and is not limited to the sound generated at the location where the subject is struck by the striking implement.

Presenter

Presenter 170 presents, to the user, an object indicating the point of interest specified by specifier 142. More specifically, presenter 170 presents, to the user, an augmented reality (AR) image of the object generated by image controller 143, for example. Presenter 170 may include a light-transmitting plate or light-transmitting film that allows the user to directly view a real space. In this case, the light-transmitting plate or the light-transmitting film may have a function for displaying AR images, and presenter 170 may have a function for projecting AR image data onto the light-transmitting plate or the light-transmitting film. This enables the user to see the AR image displayed on the light-transmitting plate or the light-transmitting film while viewing the real space through presenter 170.

Note that presenter 170 may project an AR image onto the user's retina. In this case, the AR image is displayed on the user's retina along with an image of the real space.

Presenter 170 switches the presentation of the object based on a control signal from controller 140. Presenter 170 may be controlled by image controller 143. Presenter 170 is not limited to a single presenter, and may be two or more presenters. For example, as illustrated in FIG. 1, presenter 170 may include right presenter 170a and left presenter 170b.

For example, when the sound in the predetermined band is determined to have occurred at the same point of interest, presenter 170 may present the object indicating the same point of interest to the user in a different presentation format.

For example, based on the specific action by the user detected by detector 141, presenter 170 may perform switching of the presentation format of the object indicating the point of interest, or perform switching between presenting and not presenting the object indicating the point of interest.

Additionally, for example, based on the line of sight of the user detected by detector 141, presenter 170 may perform the switching for the object indicating the point of interest to which the line of sight of the user is directed.

For example, in addition to the object indicating the point of interest currently specified by specifier 142, presenter 170 may present, to the user, an other object indicating an other point of interest specified before the point of interest in the field of view of the user.

For example, when the distance between the subject and the user exceeds a first threshold, presenter 170 may present, to the user, all objects indicating all points of interest from a set period in the past. The first threshold may be a value indicating a specific distance, such as 2 m, or may be a numerical value indicating a rate of change, such as when the distance between the subject and the user has doubled. The set period in the past may be, for example, a period from when wearable terminal 100 is turned on to when the distance is determined to exceed the first threshold, or a period from a predetermined time before the distance was determined to exceed the first threshold to when that determination is made.

Sound Outputter

When, for example, the sound obtained by sound obtainer 121 includes a sound in the predetermined band, sound outputter 180 outputs sound having increased the sound pressure of the sound in the predetermined band. Specifically, sound outputter 180 is a speaker or an earphone, and may include earphone 180a and earphone 180b, for example, as illustrated in FIG. 1. Sound outputter 180 is controlled by sound controller 144, for example.

For example, when, based on the line of sight of the user, the line of sight of the user is determined to be directed to an other point of interest specified before the point of interest, sound outputter 180 outputs a sound in the predetermined band occurring in the other point of interest. At this time, sound outputter 180 may output only the sound in the predetermined band, or may output the sound in the predetermined band included in the sound occurring at the other point of interest at a higher volume.

Sound outputter 180 may be communicably connected to controller 140 (and more specifically, to sound controller 144) of wearable terminal 100 wirelessly or by a wire. FIG. 1 illustrates an example in which earphone 180a and earphone 180b are communicably connected to sound controller 144 wirelessly.

Acceptor

Acceptor 190 is an input interface that accepts operational inputs from a user using wearable terminal 100. For example, acceptor 190 is at least one of a camera, a microphone, or a hardware button. For example, acceptor 190 may be a camera when accepting inputs made by gestures, or may be a microphone when accepting inputs made by voice. Acceptor 190 may also be a hardware button, as illustrated in FIG. 1.

2-2. Information Terminal

Information terminal 200 is, for example, a mobile information terminal such as a laptop computer, a smartphone, a tablet terminal, or the like used by the user of wearable terminal 100. For example, information terminal 200 is connected to wearable terminal 100 and server device 300 through wireless communication. Information terminal 200 may relay communication between wearable terminal 100 and server device 300, obtain data necessary for information processing from wearable terminal 100 and server device 300, analyze work data of the user, and the like.

2-3. Server Device

Server device 300 is, for example, a cloud server, but may also be an edge server. Server device 300 includes, for example, communicator 310, controller 320, storage 330, and trainer 340. Server device 300 is communicably connected to information terminal 200 and wearable terminal 100, for example. For example, server device 300 may send labeled data, trained parameters of machine learning model 331, updated information of a database in which types of anomalies in subjects are associated with sound information in a predetermined band, and the like to wearable terminal 100, or send analysis results based on the data obtained from wearable terminal 100 (e.g., the user's proficiency and the like) to information terminal 200.

Communicator

Communicator 310 is communication circuitry (a communication module) for server device 300 to communicate with wearable terminal 100 and information terminal 200 over a wide-area communication network. The communication performed by communicator 310 is wireless communication, but may be wired communication. The communication standard used in the communication is not particularly limited.

Communicator 310 may send trained parameters of machine learning model 331 trained by trainer 340 and updated data from a database (not shown) to wearable terminal 100. Communicator 310 may also receive images, sound information, user work information, and the like from wearable terminal 100.

Controller

Controller 320 performs various types of information processing pertaining to the operations of server device 300. Specifically, controller 320 includes extractor 321 and specifier 322. The functions of extractor 321 and specifier 322 are realized by a processor or microcomputer constituting controller 320 executing computer programs stored in storage 330.

Extractor

Extractor 321 inputs the sound information of the sound generated by the subject when the subject is struck with the striking implement into machine learning model 331, and extracts a sound in a characteristic frequency band output from machine learning model 331 as a candidate for the sound in the predetermined band registered in the database (not shown).

Specifier

Specifier 322 specifies a sound in a frequency band being listened for by an experienced worker (called a "model worker") from the candidates for the sound in the predetermined band extracted by extractor 321. For example, specifier 322 may specify the sound in the predetermined band from the candidates for the sound in the predetermined band based on a result of having the model worker listen to sounds in which the sound pressure of the candidates for the sound in the predetermined band has been increased. Specifier 322 stores the specified sound in the predetermined band in a database (not shown) in association with the type of anomaly in the subject.

The database is stored, for example, in storage 330.

Storage

Storage 330 is a storage device that stores control programs and the like executed by controller 320. Storage 330 may be implemented as an HDD, for example, but may be implemented as semiconductor memory. Storage 330 may store the database (not shown) and the trained machine learning model 331.

Machine learning model 331 and trainer 340 have the same details as machine learning model 151 and trainer 160 of wearable terminal 100, and will therefore not be described here.

3. Operations

Operations by wearable terminal 100 according to Embodiment 1 will be described in detail next with reference to the drawings. The following assumes that the subject is, for example, a tile on a wall surface, and that the striking implement used by the user is, for example, a sounding stick. The following also assumes that the image is a moving image, and the processing of steps S01 and S02 may be performed in parallel.

Example 1

Figure 5:
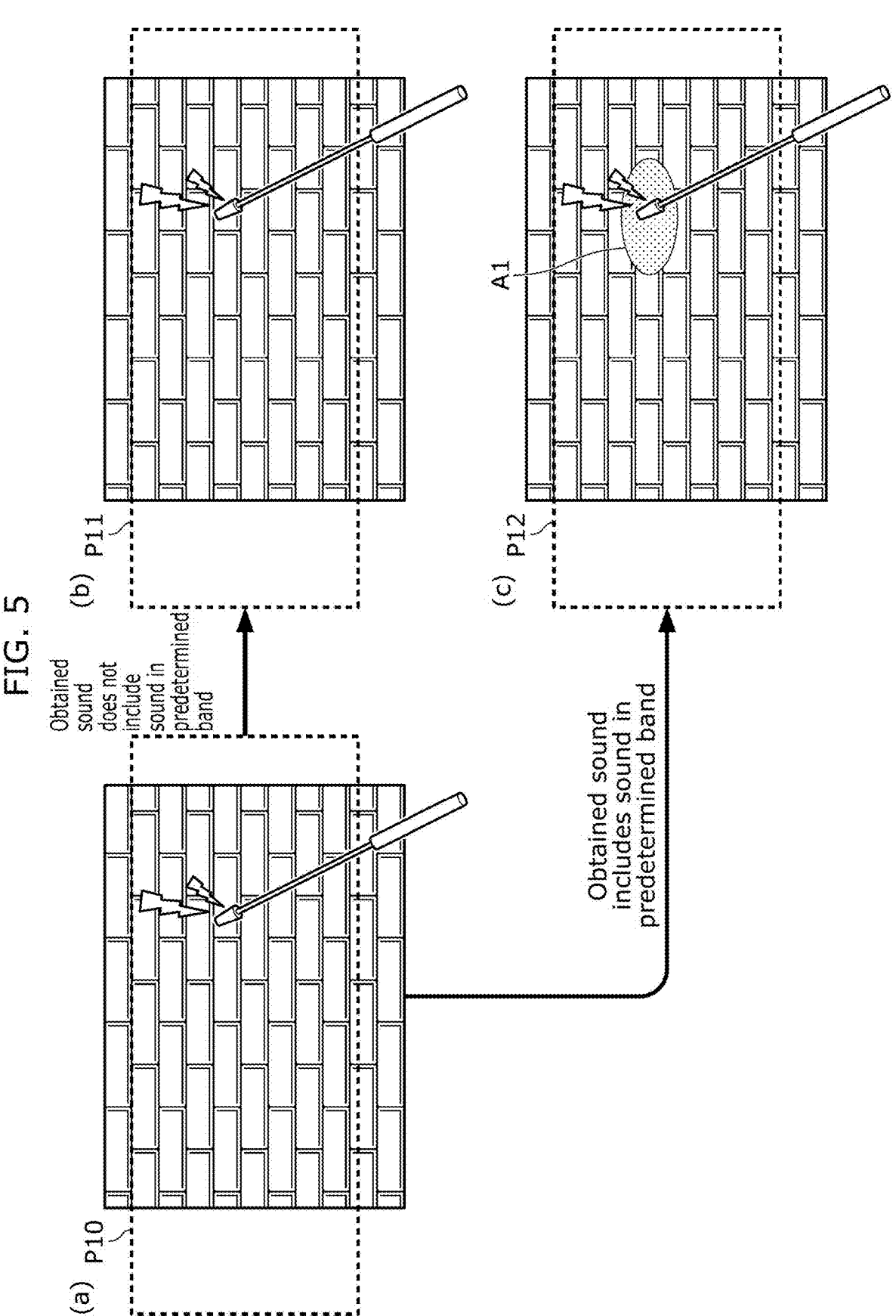
FIG. 5 is a diagram schematically illustrating Example 1 of the operations.

First, Example 1 of the operations will be described with reference to FIGS. 4 and 5. FIG. 4 is a flowchart illustrating Example 1 of operations of wearable terminal 100 according to Embodiment 1. FIG. 5 is a diagram schematically illustrating Example 1 of the operations.

First, image obtainer 120 obtains an image of a subject appearing in the field of view of the user (S01). At this time, presenter 170 does not present an object in field of view P10 of the user, as illustrated in (a) of FIG. 5. Next, sound obtainer 121 obtains sound information including a sound occurring in the vicinity of wearable terminal 100 and a direction of occurrence of the sound (S02). At this time, as illustrated in (a) of FIG. 5, the user is striking the subject with the striking implement. A sound occurring in the vicinity of wearable terminal 100 includes a sound generated by the subject when the user strikes the subject with the striking implement.

Next, specifier 142 determines whether a sound in the predetermined band is included in the sound obtained by sound obtainer 121 in step S02 (S03), and if the sound in the predetermined band is determined not to be included in the sound (No in S03), sound outputter 180 outputs the sound obtained by sound obtainer 121 in step S02 (S04). At this time, presenter 170 does not present an object in field of view P11 of the user, as illustrated in (b) of FIG. 5.

On the other hand, if specifier 142 determines that the sound in the predetermined band is included in the sound obtained by sound obtainer 121 in step S02 (Yes in S03), sound outputter 180 outputs the sound obtained by sound obtainer 121 in step S02 (S05). Then, based on the sound information obtained in step S02 and the image obtained in step S01, specifier 142 specifies a point of interest, which is the location where the sound in the predetermined band occurred in the subject (S06).

Next, presenter 170 presents, to the user, an object indicating the point of interest (S07). At this time, presenter 170 presents an AR image of object A1 superimposed on the actual subject appearing in field of view P12 of the user, as illustrated in (c) of FIG. 5.

As described above, in Example 1 of the operations, wearable terminal 100 superimposes an AR image of object A1 indicating the location where the sound in the predetermined band occurred in the subject (called a "point of interest") on the actual subject appearing in field of view P12 of the user. Through this, the user can see the location where the sound in the predetermined band occurred (called a "point of interest"). Wearable terminal 100 can therefore present the knowledge of an auditory task to the user.

Example 2

Next, Example 2 of the operations will be described with reference to FIG. 6. In Example 1 of the operations, wearable terminal 100 superimposed an AR image of the object indicating the location where the sound in the predetermined band occurred on the actual subject appearing in the field of view of the user. In Example 2 of the operations, wearable terminal 100 further outputs the sound having increased the sound pressure of the sound in the predetermined band.

Figure 6:
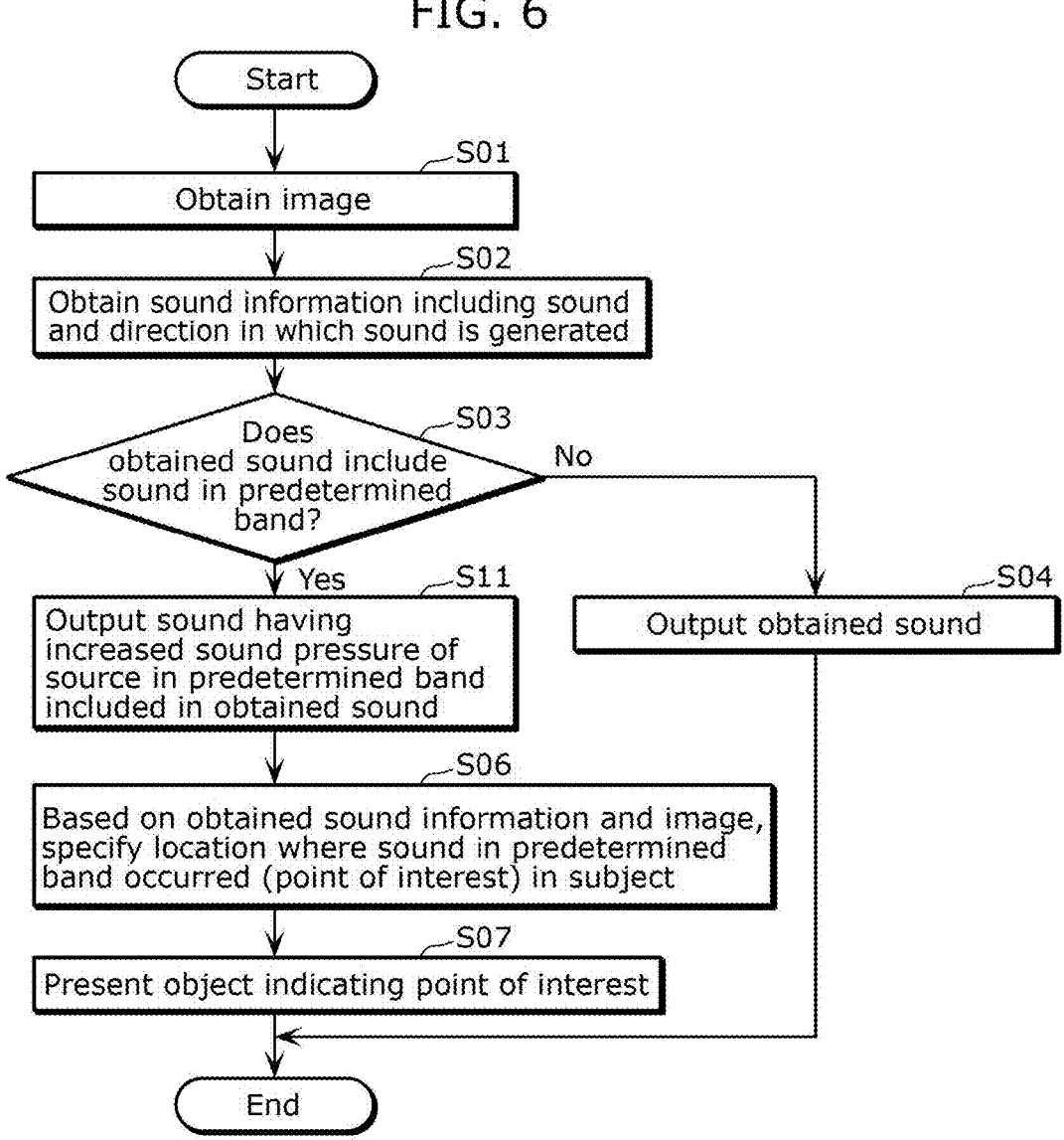
FIG. 6 is a flowchart illustrating Example 2 of operations of the wearable terminal according to Embodiment 1.

FIG. 6 is a flowchart illustrating Example 2 of operations of wearable terminal 100 according to Embodiment 1. In FIG. 6, processing that is the same as the processing in FIG. 5 will be given the same step numbers.

Image obtainer 120 obtains an image of the subject appearing in the field of view of the user (S01), and sound obtainer 121 obtains sound information including a sound occurring in the vicinity of wearable terminal 100 and a direction of occurrence of the sound (S02).

Next, specifier 142 determines whether a sound in the predetermined band is included in the sound obtained by sound obtainer 121 in step S02 (S03), and if the sound in the predetermined band is determined not to be included in the sound (No in S03), sound outputter 180 outputs the sound obtained by sound obtainer 121 in step S02 (S04).

On the other hand, if specifier 142 determines that the sound in the predetermined band is included in the sound obtained by sound obtainer 121 in step S02 (Yes in S03), sound outputter 180 outputs the sound having increased the sound pressure of the sound in the predetermined band included in the sound obtained by sound obtainer 121 in step S02 (S11). Then, based on the sound information obtained in step S02 and the image obtained in step S01, specifier 142 specifies a point of interest, which is the location where the sound in the predetermined band occurred in the subject (S06).

Next, presenter 170 presents, to the user, an object indicating the point of interest (S07).

As described above, in Example 2 of the operations, wearable terminal 100 superimposes an AR image of object A1 indicating the location where the sound in the predetermined band occurred in the subject (called a "point of interest") on the actual subject appearing in field of view P12 of the user, and furthermore outputs the sound having increased the sound pressure of the sound in the predetermined band. Through this, the user can more clearly recognize the sound in the predetermined band, which makes it easier to understand how to distinguish the sound in the predetermined band. Wearable terminal 100 can therefore effectively present knowledge of auditory tasks to the user.

Example 3

Next, Example 3 of the operations will be described with reference to FIGS. 7 and 8. In Examples 1 and 2 of the operations, wearable terminal 100 superimposed an AR image of the object indicating the location where the sound in the predetermined band occurred on the actual subject appearing in the field of view of the user. In Example 3 of the operations, when the sound in the predetermined band is determined to have occurred at the same point of interest, wearable terminal 100 presents the object indicating the same point of interest to the user in a different presentation format.

Figure 7:
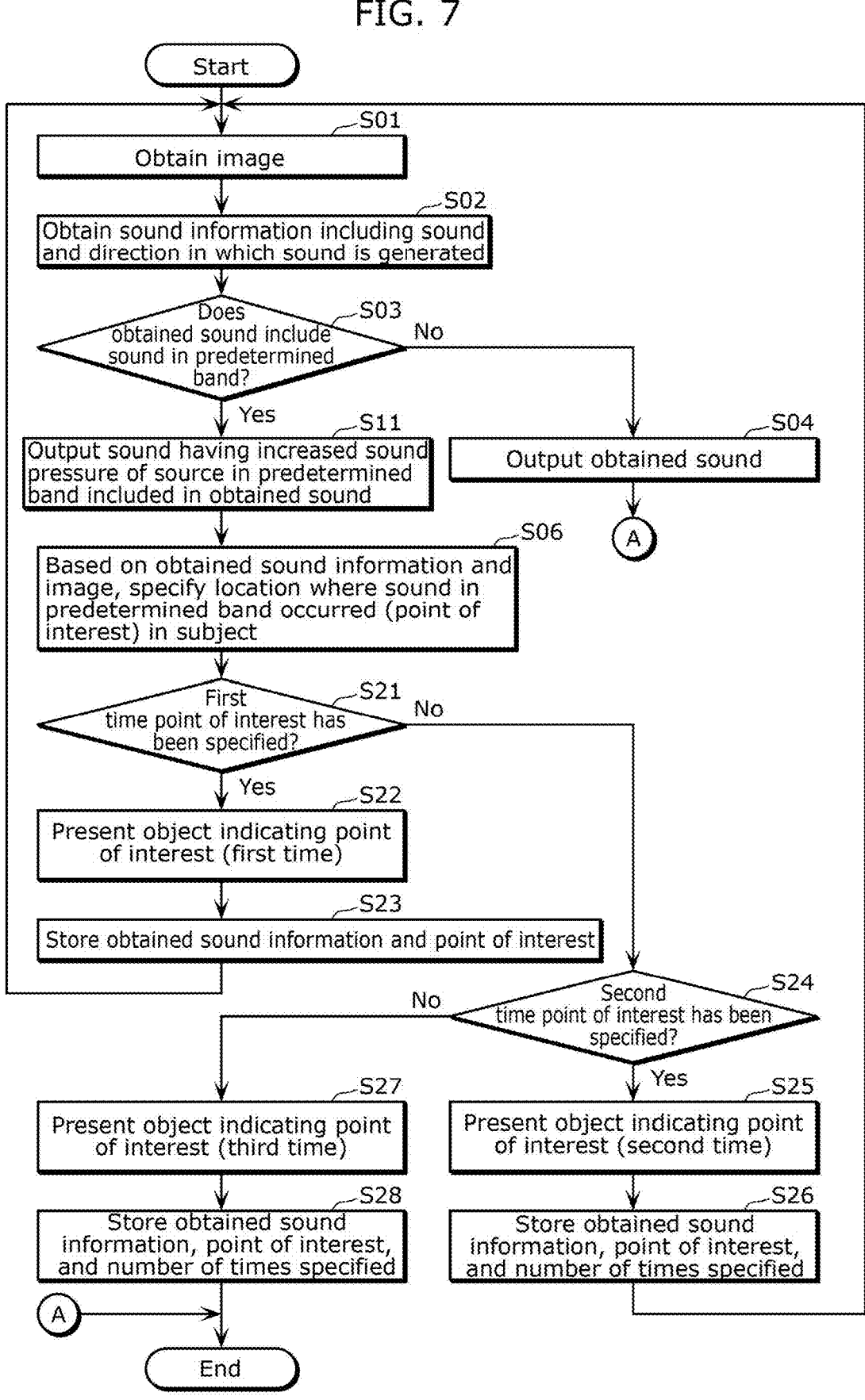
FIG. 7 is a flowchart illustrating Example 3 of operations of the wearable terminal according to Embodiment 1.
Figure 8:
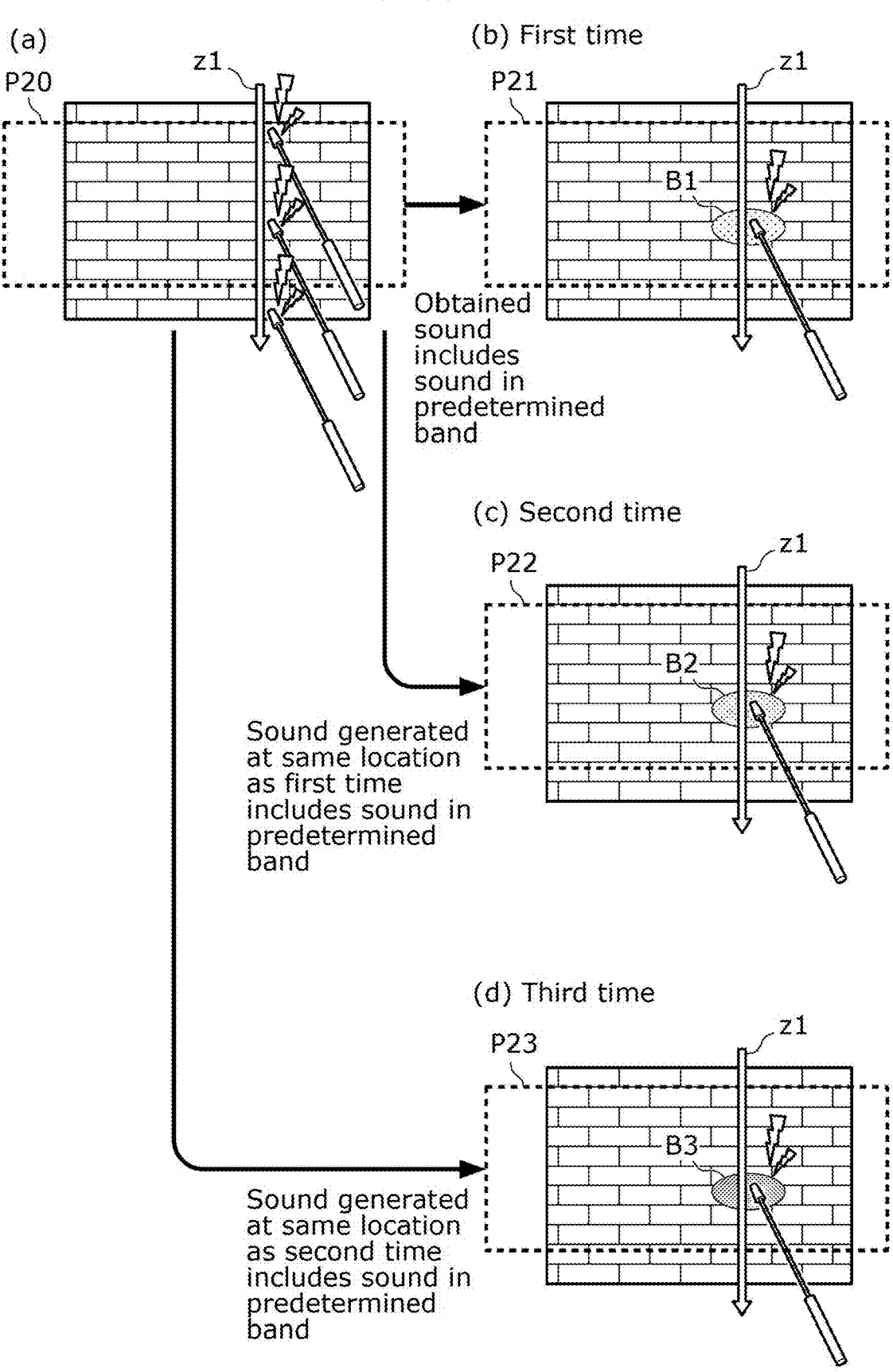
FIG. 8 is a diagram schematically illustrating Example 3 of the operations.

FIG. 7 is a flowchart illustrating Example 3 of operations of wearable terminal 100 according to Embodiment 1. FIG. 8 is a diagram schematically illustrating Example 3 of the operations. In FIG. 7, processing that is the same as the processing in FIGS. 5 and 6 will be given the same step numbers.

Image obtainer 120 obtains an image of the subject appearing in the field of view of the user (S01), and sound obtainer 121 obtains sound information including a sound occurring in the vicinity of wearable terminal 100 and a direction of occurrence of the sound (S02). At this time, as illustrated in (a) of FIG. 8, the user listens to a sound generated by the subject while striking the subject with a striking implement in the direction of arrow z1, for example, and sound obtainer 121 obtains sound information of the sound.

Next, specifier 142 determines whether a sound in the predetermined band is included in the sound obtained by sound obtainer 121 in step S02 (S03), and if the sound in the predetermined band is determined not to be included in the sound (No in S03), sound outputter 180 outputs the sound obtained by sound obtainer 121 in step S02 (S04). At this time, presenter 170 does not present an object in field of view P20 of the user, as illustrated in (a) of FIG. 8.

On the other hand, if specifier 142 determines that the sound in the predetermined band is included in the sound obtained by sound obtainer 121 in step S02 (Yes in S03), sound outputter 180 outputs the sound having increased the sound pressure of the sound in the predetermined band included in the sound obtained by sound obtainer 121 in step S02 (S11). Then, based on the sound information obtained in step S02 and the image obtained in step S01, specifier 142 specifies a point of interest, which is the location where the sound in the predetermined band occurred in the subject (S06).

Next, specifier 142 determines whether the point of interest has been specified for the first time (S21), and if the point of interest is determined to have been specified for the first time (Yes in S21), presenter 170 presents an object indicating the point of interest to the user (first time) (S22). In the first time of the presentation, presenter 170 may present the object to the user in the same presentation format (e.g., color type and darkness) as in Examples 1 and 2, or may present the object to the user in a different presentation format (e.g., a lighter color) than in Examples 1 and 2. For example, presenter 170 presents an AR image of object B1 superimposed on the actual subject appearing in field of view P21 of the user, as illustrated in (b) of FIG. 8.

Next, specifier 142 stores, in storage 150, the sound information obtained by the sound obtainer in step S02 in association with the point of interest (and more specifically, position information of the point of interest in the image) specified by specifier 142 in step S06 (S23). Wearable terminal 100 then returns to step S01.

On the other hand, if it is determined in step S21 that the point of interest has not been specified for the first time (No in S21), specifier 142 determines whether the point of interest has been specified for the second time (S24). If specifier 142 determines that the point of interest has been specified for the second time (Yes in S24), presenter 170 presents an object indicating the point of interest to the user (second time) (S25). In the second time of the presentation, presenter 170 may present the object to the user in a different presentation format (e.g., a different type of color) from the first time of the presentation, or may present the object to the user in a different presentation format (e.g., a darker color than the first time) from the first time of the presentation. For example, if it is determined that the sound in the predetermined band is included in the sound generated at the same location as the first time, presenter 170 presents an AR image of object B2 superimposed on the actual subject appearing in field of view P22 of the user, as illustrated in (c) of FIG. 8.

Next, specifier 142 stores, in storage 150, the sound information obtained by the sound obtainer in step S02, the point of interest (and more specifically, position information of the point of interest in the image) specified by specifier 142 in step S06, and the number of times the point of interest has been specified (here, the second time), in association with each other (S26). Wearable terminal 100 then returns to step S01.

On the other hand, if it is determined in step S24 that the point of interest has not been specified for the second time (No in S24), specifier 142 determines that the point of interest has been specified for the third time (not shown), and presenter 170 presents an object indicating the point of interest to the user (third time) (S27). In the third time of the presentation, presenter 170 may present the object to the user in a different presentation format (e.g., a different type of color) from the first and second time of the presentation, or may present the object to the user in a different presentation format (e.g., a darker color than the second time) from the first and second time of the presentation. For example, if it is determined that the sound in the predetermined band is included in the sound generated at the same location as the second time, presenter 170 presents an AR image of object B3 superimposed on the actual subject appearing in field of view P23 of the user, as illustrated in (d) of FIG. 8.

Next, specifier 142 stores, in storage 150, the sound information obtained by the sound obtainer in step S02, the point of interest (and more specifically, position information of the point of interest in the image) specified by specifier 142 in step S06, and the number of times the point of interest has been specified (here, three times), in association with each other (S28).

As described above, in Example 3 of the operations, wearable terminal 100 presents the object indicating the same point of interest to the user in a different presentation format in accordance with the number of times the same point of interest has been specified. This makes it easier for wearable terminal 100 to make the user aware of the sound in the predetermined band generated at the same point of interest. Wearable terminal 100 can therefore effectively present knowledge of auditory tasks to the user.

Figure 9:
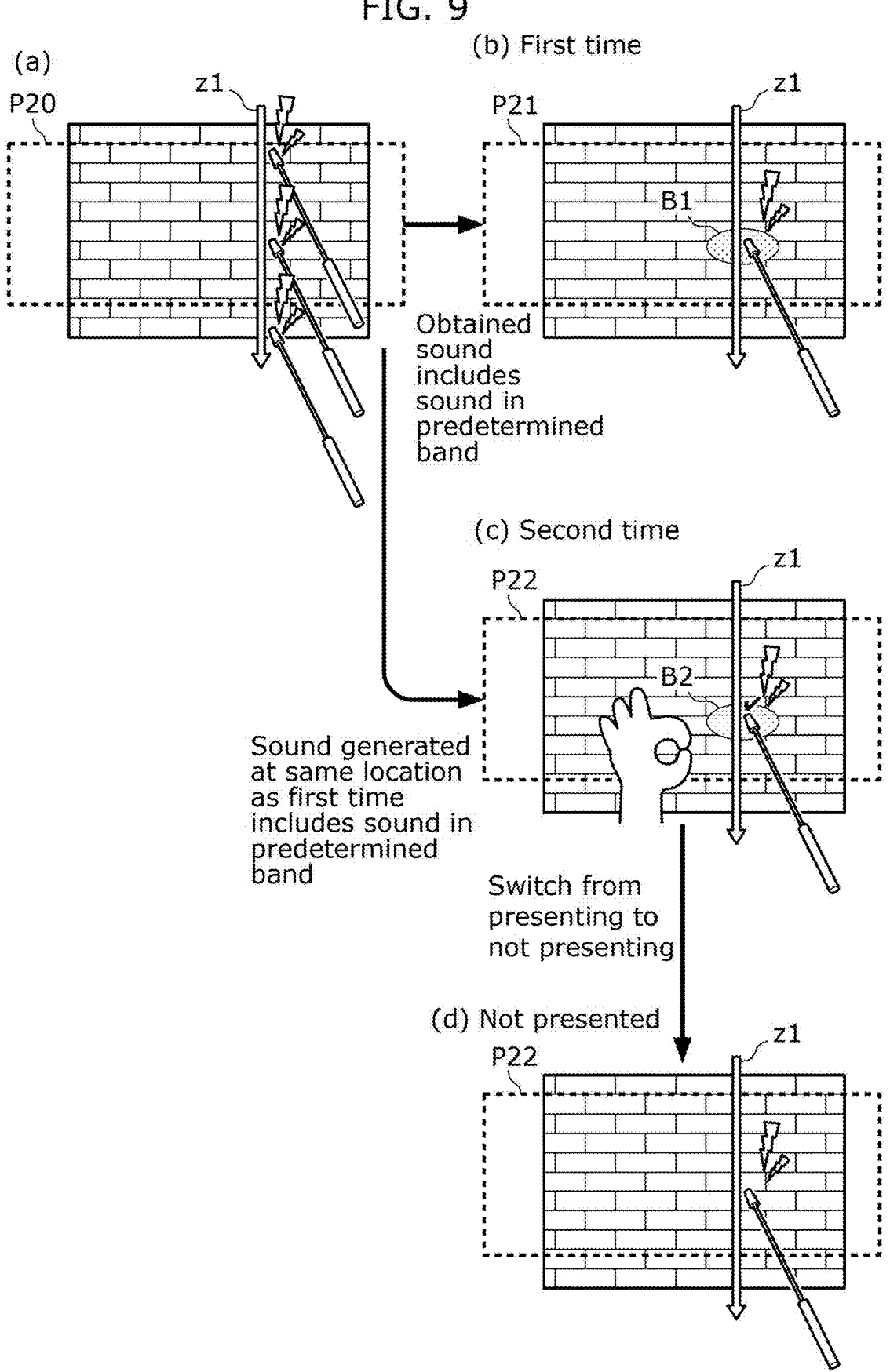
FIG. 9 is a diagram schematically illustrating an example of switching the presentation of an object to not being presented in Example 3 of the operations.

Note that in Example 3 of the operations, the object may be switched from being presented to not being presented when detector 141 detects a specific action by the user. FIG. 9 is a diagram schematically illustrating an example of switching the presentation of an object to not being presented in Example 3 of the operations. In FIG. 9, configurations that are the same as those illustrated in FIG. 8 are given the same reference signs. Note that (a) and (b) of FIG. 9 correspond to (a) and (b) of FIG. 8, and will therefore not be described.

If it is determined that the sound in the predetermined band is included in the sound generated at the same location as the first time, presenter 170 presents an AR image of object B2 superimposed on the actual subject appearing in field of view P22 of the user, as illustrated in (c) of FIG. 9. At this time, the user may perform a specific action to make an instruction to switch object B2 from being presented to not being presented, and switch the presentation of the object. For example, the specific action may be a specific action in which the user brings their fingers together, or may be an action of drawing a V-shape with the tip of the striking implement.

When detector 141 detects the specific action, presenter 170 switches the AR image of object B2 indicating the point of interest superimposed on the actual subject appearing in field of view P22 of the user to not being presented based on the specific action, as illustrated in (d) of FIG. 9.

As described above, wearable terminal 100 can switch the object to not being presented based on a specific action by the user. Wearable terminal 100 can therefore adjust the presentation of the knowledge of an auditory task to the user according to the user's proficiency.

Example 4

Figure 10:
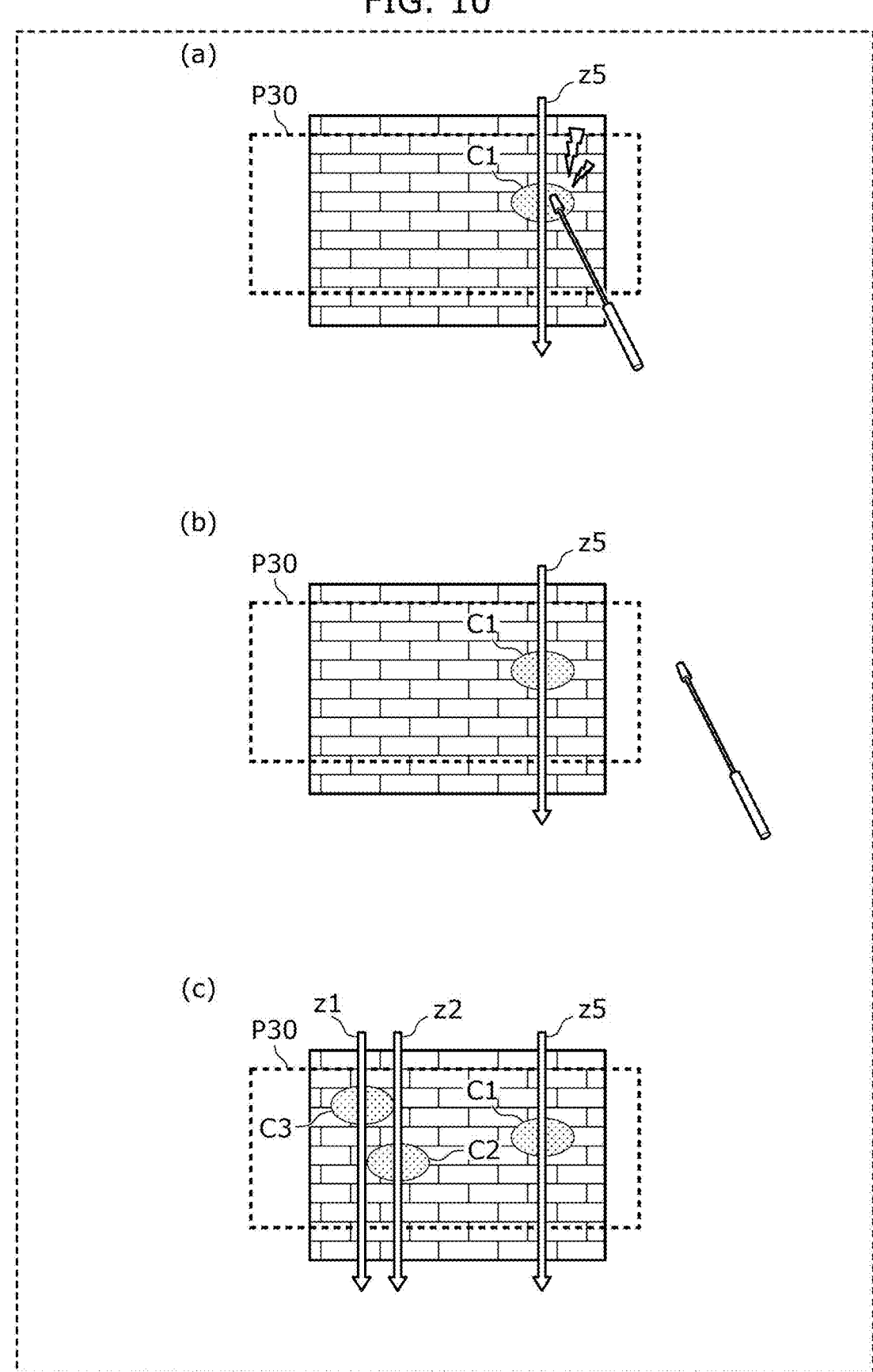
FIG. 10 is a diagram schematically illustrating Example 4 of operations of the wearable terminal according to Embodiment 1.

Next, Example 4 of the operations will be described with reference to FIG. 10. FIG. 10 is a diagram schematically illustrating Example 4 of operations of wearable terminal 100 according to Embodiment 1. Example 3 of the operations described, with reference to FIG. 9, an example in which wearable terminal 100 switches the object to not being presented based on a specific action by the user. In Example 4 of the operations, wearable terminal 100 presents, based on a specific action by the user, all objects indicating all points of interest specified in a past set period after the detection of the specific action.

As illustrated in (a) of FIG. 10, the user listens to a sound generated by the subject while striking the subject with a striking implement in the direction of arrow z5, for example, and sound obtainer 121 obtains sound information of the sound. At this time, presenter 170 superimposes and presents, to the user, an AR image of object C1 indicating the point of interest specified by specifier 142 on the actual subject appearing in field of view P30 of the user.

Next, as illustrated in (b) of FIG. 10, when the user removes the striking implement from field of view P30 of the user, detector 141 detects that action as a specific action by the user. If the striking implement is determined to have disappeared from the image of the subject appearing in field of view P30 of the user, presenter 170 presents, to the user, all objects indicating all points of interest specified in the subject appearing in field of view P30 of the user, as illustrated in (c) of FIG. 10. For example, assume that the user has struck the subject in the direction of arrow z1 and arrow z2 with the striking implement before striking the subject with the striking implement in the direction of arrow z5. At this time, in addition to object C1 indicating the point of interest, presenter 170 presents, to the user, AR images of objects C2 and C3 indicating points of interest specified in a set period in the past, so as to be superimposed on the subject appearing in field of view P30 of the user, as illustrated in (c) of FIG. 10.

As described above, in Example 4 of the operations, wearable terminal 100 presents, based on a specific action by the user (here, the striking implement leaving field of view P30 of the user), all objects C1, C2, and C3 indicating all points of interest specified in a past set period, to the user. Through this, wearable terminal 100 can comprehensively present all the points of interest detected in a past set period to the user, which makes it easier for the user to understand all the specified points of interest.

Example 5

Figure 11:
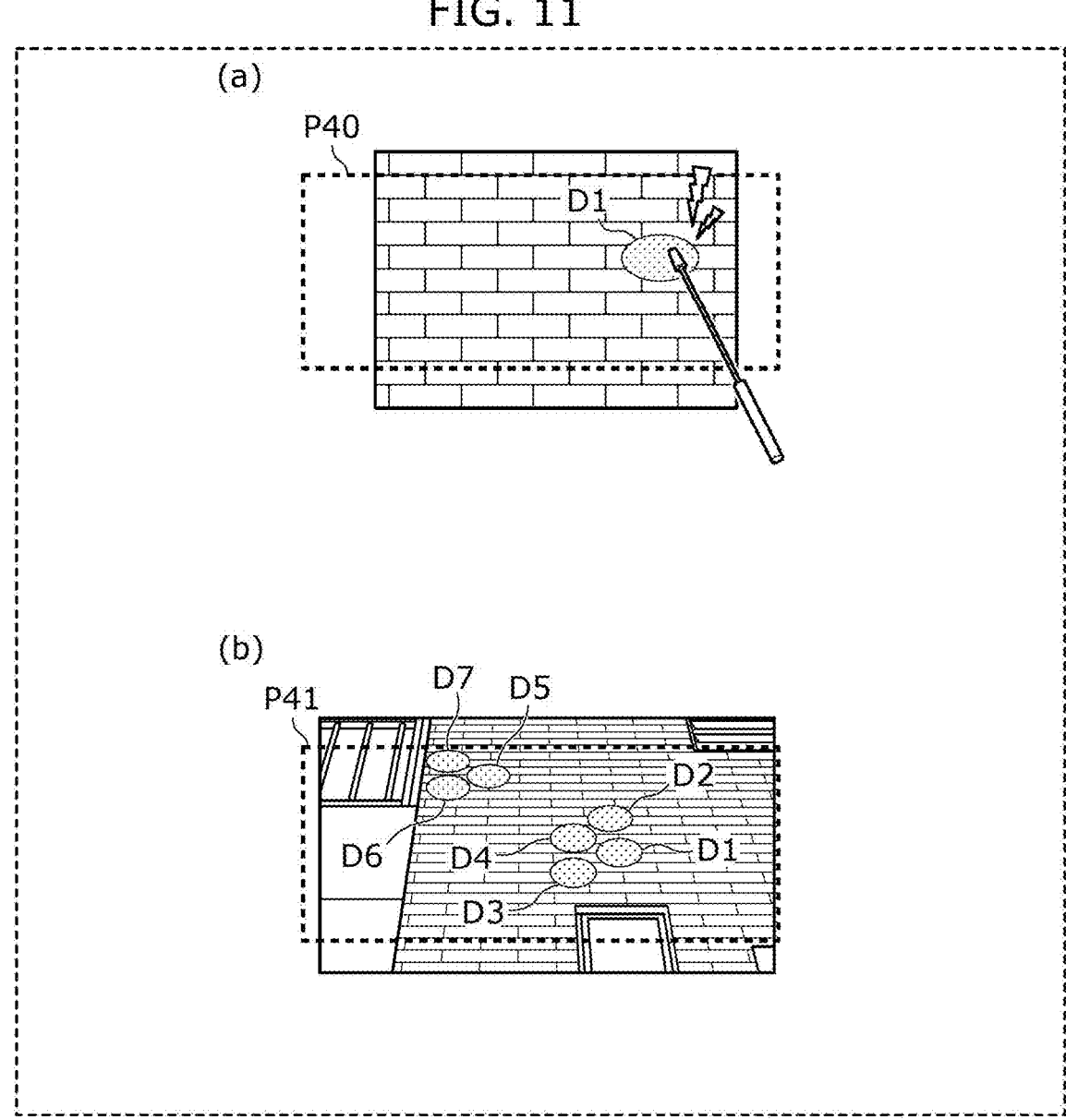
FIG. 11 is a diagram schematically illustrating Example 5 of operations of the wearable terminal according to Embodiment 1.

Next, Example 5 of the operations will be described with reference to FIG. 11. FIG. 11 is a diagram schematically illustrating Example 5 of operations of wearable terminal 100 according to Embodiment 1. Examples 3 and 4 of the operations described examples in which wearable terminal 100 switches the presentation format of the object based on a specific action by the user. In Example 5 of the operations, detector 141 detects a distance between the subject and the user, and wearable terminal 100 presents all objects indicating all points of interest specified in a set period in the past when the distance between the subject and the user detected by detector 141 exceeds a first threshold.

The first threshold may be a value indicating a specific distance, such as 2 m, or may be a numerical value indicating a rate of change, such as when the distance between the subject and the user has doubled. The set period in the past may be, for example, a period from when wearable terminal 100 is turned on to when the distance is determined to exceed the first threshold, or a period from a predetermined time before the distance was determined to exceed the first threshold to when that determination is made.

As illustrated in (a) of FIG. 11, presenter 170 superimposes and presents, to the user, an AR image of object D1 indicating the point of interest specified by specifier 142 on the actual subject appearing in field of view P40 of the user.

Next, as illustrated in (b) of FIG. 10, if the user has moved away from the subject and the distance between the subject and the user detected by detector 141 exceeds the first threshold, presenter 170 presents, to the user, AR images of objects D1, D2, D3, D4, D5, D6, and D7 indicating points of interest specified in a set period in the past, superimposed on the subject appearing in field of view P41 of the user.

As described above, in Example 5 of the operations, wearable terminal 100 can present, to the user, where, on the subject, all the points of interest specified over a set period in the past are located, in response to detecting that the user is at least a set distance from the subject.

Example 6

Figure 12:
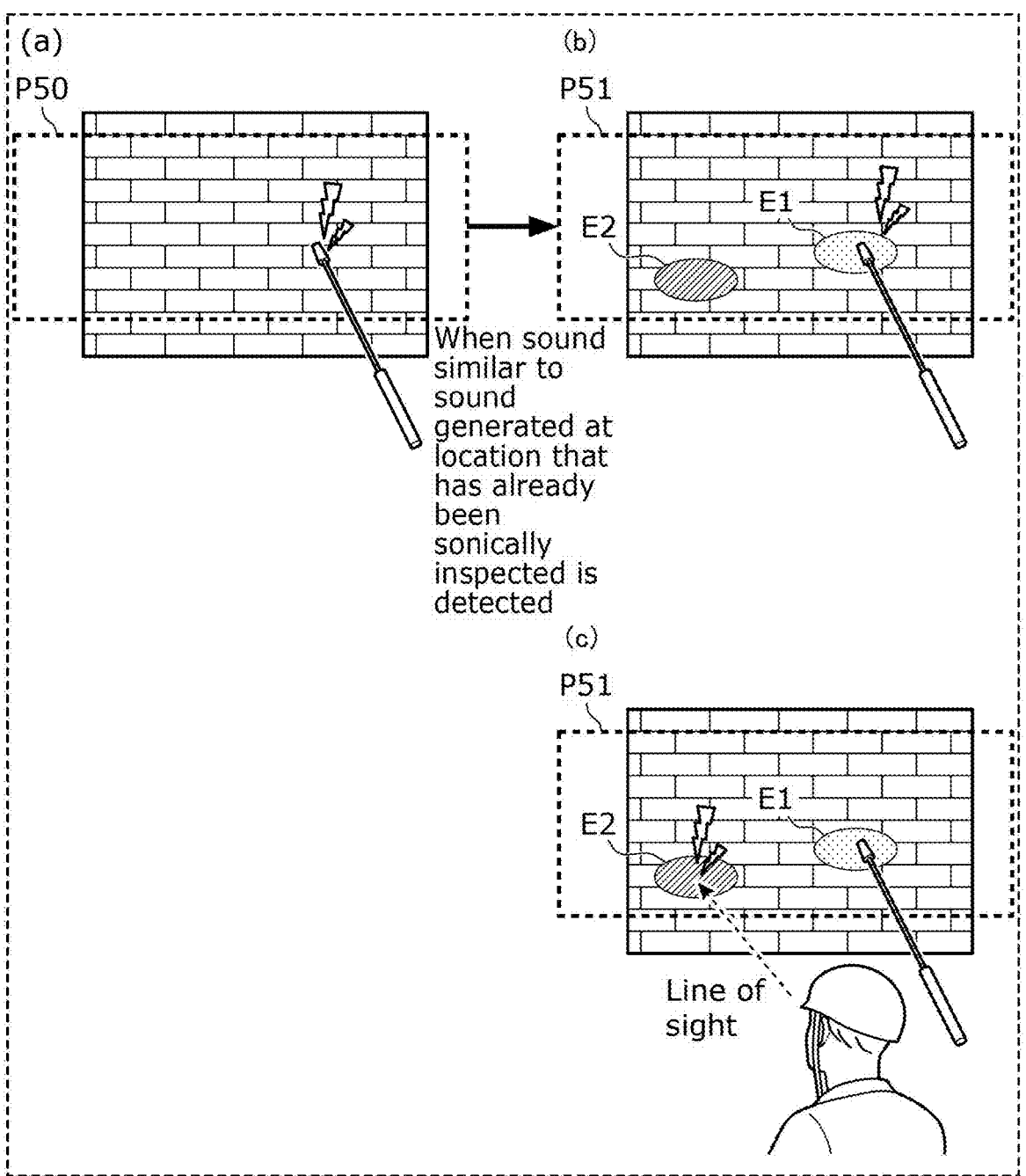
FIG. 12 is a diagram schematically illustrating Example 6 of operations of the wearable terminal according to Embodiment 1.

Next, Example 6 of the operations will be described with reference to FIG. 12. FIG. 12 is a diagram schematically illustrating Example 6 of operations of the wearable terminal according to Embodiment 1. Examples 3 and 4 of the operations described examples in which wearable terminal 100 switches the presentation format of the object based on a specific action by the user. In Example 6 of the operations, when the object indicating the point of interest currently specified and another object indicating another point of interest specified before the point of interest was specified are presented to the user, wearable terminal 100 outputs the sound in the predetermined band occurring at the other point of interest when the line of sight of the user is determined to be directed to the other object.

For example, if, when the user strikes the subject with the striking implement, the sound in the predetermined band is determined not to be included in the sound obtained by sound obtainer 121, wearable terminal 100 does not present the object in field of view P50 of the user, as illustrated in (a) of FIG. 12.

On the other hand, if the sound in the predetermined band is determined to be included in the sound obtained by sound obtainer 121, wearable terminal 100 specifies a point of interest, as illustrated in (b) of FIG. 12. At this time, in addition to object E1 indicating the specified point of interest, wearable terminal 100 presents, to the user, another object E2 indicating another point of interest specified before the point of interest, in field of view P51 of the user. For example, the other point of interest is a location where the user has already made a sonic inspection. If wearable terminal 100 detects a sound similar to the sound generated at the other point of interest, presenter 170 presents AR images of objects E1 and E2 indicating the location where the similar sound was detected (called a "point of interest") and the other point of interest, superimposed on the actual subject appearing in field of view P51 of the user. Note that object E1 and object E2 may be presented with different types of colors.

When the user wishes to hear the sound in the predetermined band generated at the other point of interest, the user may instruct the sound generated at the other point of interest to be output by moving their line of sight to the other point of interest, as illustrated in (c) of FIG. 12. When detector 141 of wearable terminal 100 detects the line of sight of the user, based on the line of sight of the user, sound outputter 180 outputs the sound in the predetermined band generated at the other point of interest when the line of sight of the user is determined to be directed to object E2 indicating the other point of interest. At this time, sound outputter 180 may output the sound having increased the sound pressure of the sound in the predetermined band.

As described above, wearable terminal 100 can output a sound in a predetermined band generated at the other point of interest when the user's line of sight is directed to the other point of interest, and teach the user the sound in the predetermined band.

Example 7

Figure 13:
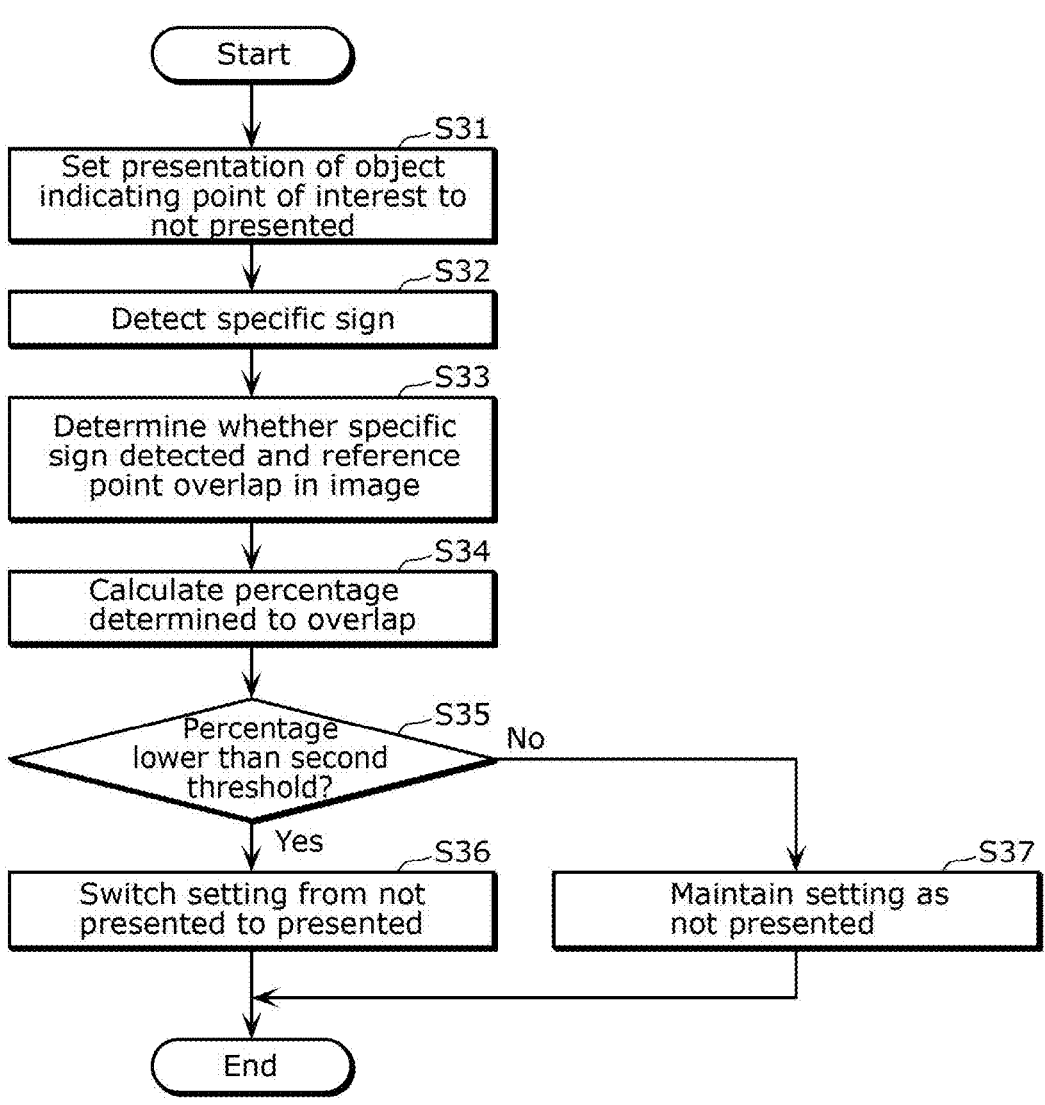
FIG. 13 is a flowchart illustrating Example 7 of operations of the wearable terminal according to Embodiment 1.

Next, Example 7 of the operations will be described with reference to FIG. 13. FIG. 13 is a flowchart illustrating Example 7 of operations of the wearable terminal according to Embodiment 1. Example 7 will describe operations performed by wearable terminal 100 when training the user. In Example 7, a reference point indicating a correct point of interest is prepared in advance, and when switching from not presenting the object to presenting the object, wearable terminal 100 switches from not presenting the object to presenting the object when a percentage of times a specific sign of the user is determined to overlap with the reference point is less than a second threshold.

For example, when the user selects a training mode, wearable terminal 100 sets the object to not be presented (S31).

Next, although not illustrated, image obtainer 120 obtains an image of a subject appearing in the field of view of the user (step S01 in FIG. 4).

Next, the user strikes the subject with the striking implement and listens to the sound generated by the subject. Although not illustrated, at this time, sound obtainer 121 obtains sound information including a sound occurring in the vicinity of wearable terminal 100 and a direction of occurrence of the sound (step S02 of FIG. 4), and specifier 142 determines whether a sound in a predetermined band is included in the sound obtained by sound obtainer 121 in step S02 (step S03 of FIG. 4). Then, if specifier 142 determines that the sound in the predetermined band is included (Yes in step S03), based on the sound in the predetermined band and the location where the sound in the predetermined band has occurred, controller 140 may read out, from storage 150, information pertaining to a reference point overlapping with that location (not shown). Note that the location where the sound in the predetermined band occurred is included in the reference point.

If the user determines that the sound in the predetermined band is included in the sound they heard, the user indicates a specific sign as a specific action. For example, as the specific sign, the user may use chalk to circle the location where the sound in the predetermined band is determined to have occurred in the subject.

Detector 141 detects the specific sign as a specific action (S32). Next, controller 140 determines whether the specific sign detected by detector 141 overlaps with the reference point in the image (S33), and calculates a percentage of times the specific sign is determined to overlap with the reference point (S34). More specifically, in step S34, controller 140 calculates a percentage of the number of times the specific sign is determined to overlap with the reference point among all the times the determination was made in step S33.

Note that in step S33, controller 140 may determine that the specific sign and the reference point overlap not only when a region indicating the specific sign and region indicating the reference point overlap completely in the image, but also when those regions overlap at least partially.

Next, controller 140 determines whether the percentage is less than a second threshold (S35). If the percentage is determined to be less than the second threshold (Yes in S35), controller 140 switches from not presenting the object to presenting the object (S36). On the other hand, if the percentage is determined not to be less than the second threshold (e.g., 70%) (No in S35), controller 140 keeps the object not presented (S37).

As described above, in Example 7 of the operations, wearable terminal 100 switches from not presenting the object to presenting the object when the percentage of times the location of the specific sign indicated by the user and the location of the reference point are determined to overlap in the image is no greater than the second threshold. Accordingly, when the user's proficiency has not yet reached a certain level, wearable terminal 100 provides correct data by presenting the object indicating the reference point to the user, which makes it possible to train the user for the auditory task effectively in accordance with the user's proficiency.

In Example 7 of the operations, the reference point, which is a correct point of interest, is prepared in advance, but the reference point need not be prepared in advance.

For example, when the object is set not to be presented, controller 140 keeps the object not presented when, in the image, a specific sign detected by detector 141 as a specific action is determined to at least partially overlap with a point of interest, specified by specifier 142; and switches from not presenting the object to presenting the object when the specific sign is determined not to overlap with the point of interest in the image.

Through this, wearable terminal 100 does not present the object when the user has successfully identified the sound in the predetermined band, but presents the object when the user is unable to identify the sound in the predetermined band, which makes it possible for the user to confirm whether their determination is correct each time. Wearable terminal 100 can therefore effectively train the user to identify sounds in the predetermined band.

Additionally, for example, when the specific sign is determined not to overlap with the point of interest a predetermined number of times (e.g., three times) consecutively, controller 140 may switch from not presenting the object to presenting the object.

Through this, wearable terminal 100 presents the object when the user is unable to identify the sound in the predetermined band for a predetermined number of times consecutively, which makes it possible to make a user who has undergone a certain amount of training aware that they have not successfully identified the sound in the predetermined band, for example.

Example 8

Figure 14:
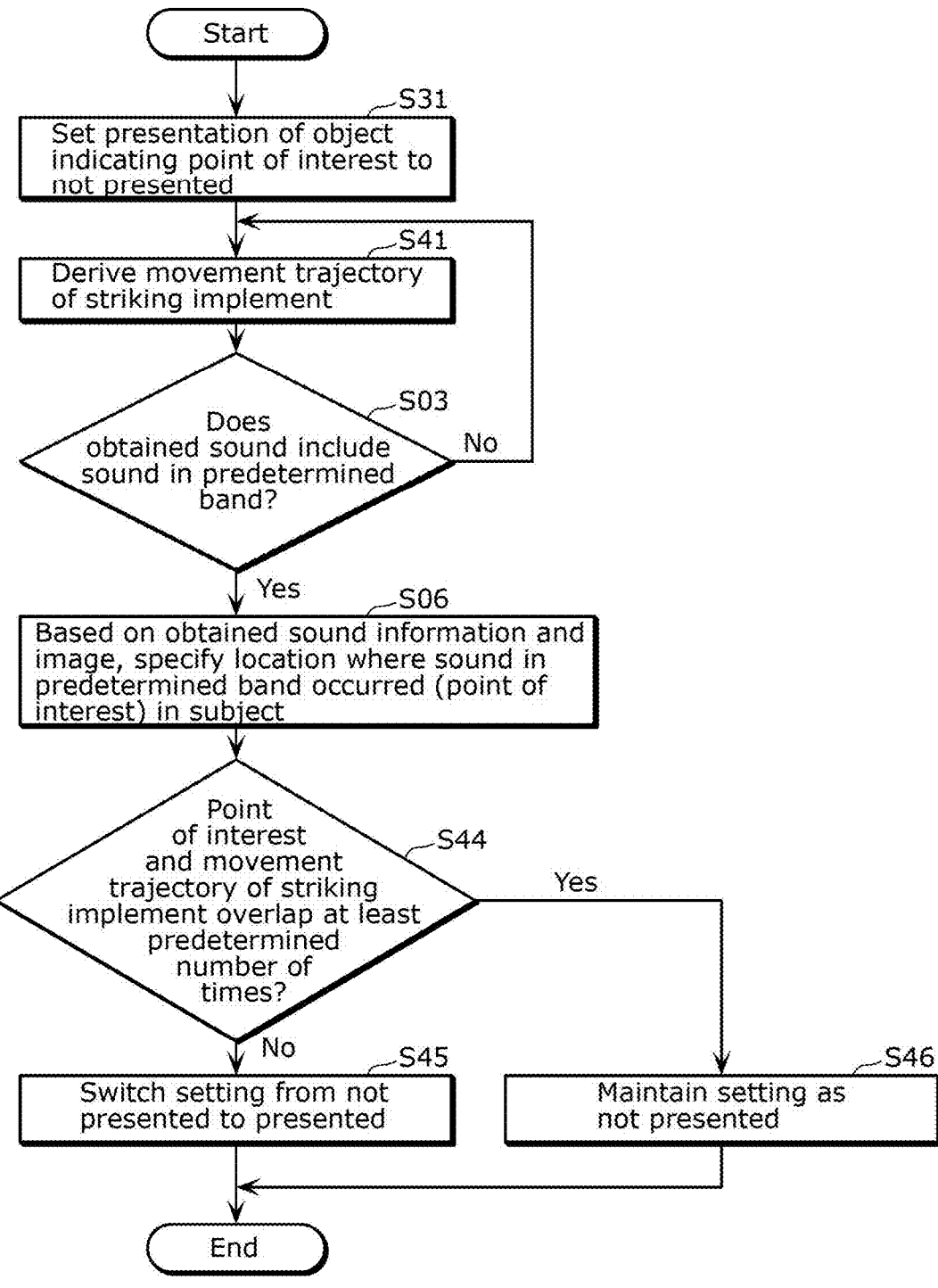
FIG. 14 is a flowchart illustrating Example 8 of operations of the wearable terminal according to Embodiment 1.
Figure 15:
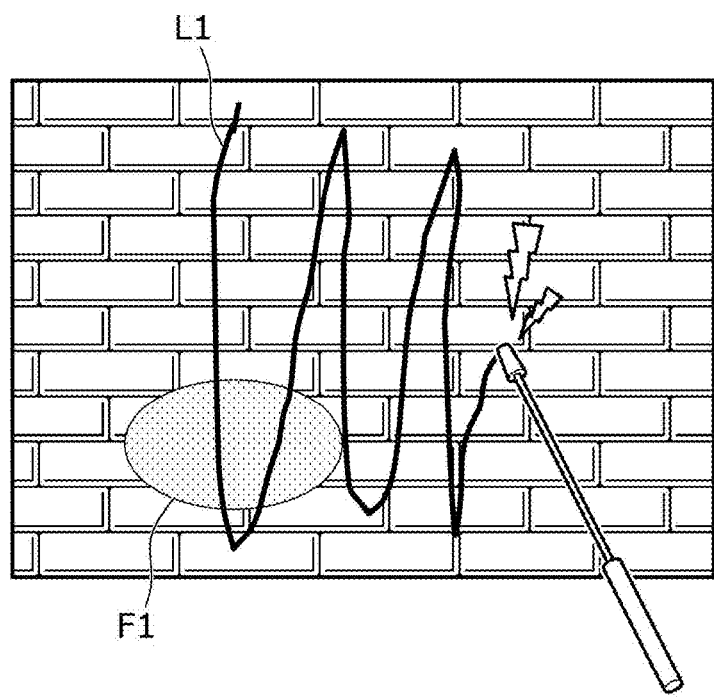
FIG. 15 is a diagram schematically illustrating Example 8 of the operations.

Next, Example 8 of the operations will be described with reference to FIG. 14. FIG. 14 is a flowchart illustrating Example 8 of operations of the wearable terminal according to Embodiment 1. FIG. 15 is a diagram schematically illustrating Example 8 of the operations. In FIG. 14, processing that is the same as the processing in FIG. 13 will be given the same step numbers.

Example 8 of the operations will describe operations performed by wearable terminal 100 when the user makes a selection to set the object to not be presented. In Example 7 of the operations, the setting of the presentation was switched based on whether the specific sign overlaps with the reference point or the point of interest in the image. However, in Example 8 of the operations, the setting of the presentation is switched based on a total number of times the movement trajectory of the striking implement used by the user overlaps with the point of interest. Specifically, in Example 8 of the operations, when the object is set to not be presented, controller 140 keeps the object not presented when, in the image, the movement trajectory of the striking implement used by the user for sonically inspecting the subject overlaps with a point of interest, specified by specifier 142, fewer than a predetermined number of times (e.g., three times); and switches from not presenting the object to presenting the object when the movement trajectory of the striking implement overlaps with the point of interest at least the predetermined number of times (e.g., three times) in the image.

For example, when the user makes a selection for setting the object to being presented, wearable terminal 100 sets the object to not be presented (S31).

Next, although not illustrated, image obtainer 120 obtains an image of a subject appearing in the field of view of the user (step S01 in FIG. 4).

Next, as illustrated in FIG. 15, the user strikes the subject while moving the striking implement back and forth in a predetermined direction (e.g., vertically, when the subject is a wall) over the subject, and listens to the sound generated by the subject. Although not illustrated, at this time, sound obtainer 121 obtains sound information including a sound occurring in the vicinity of wearable terminal 100 and a direction of occurrence of the sound (step S02 of FIG. 4).

When detector 141 detects the movement of the striking implement, controller 140 derives movement trajectory L1 of the striking implement in the image (S41).

Next, specifier 142 determines whether a sound in the predetermined band is included in the sound obtained by sound obtainer 121 (S03), and if the sound in the predetermined band is determined not to be included in the sound (No in S03), sound outputter 180 outputs the sound obtained by sound obtainer 121 (not shown) and returns to the step of obtaining the image (not shown in FIG. 14).

On the other hand, if specifier 142 determines that the sound in the predetermined band is included in the sound obtained by sound obtainer 121 (Yes in S03), sound outputter 180 outputs the sound obtained by sound obtainer 121 in step S02 (not shown in FIG. 14), and, based on the sound information obtained by sound obtainer 121 and the image obtained by image obtainer 120, specifies a point of interest that is the location where the sound in the predetermined band occurred in the subject (S06).

Next, controller 140 determines whether the point of interest specified in step S06 and movement trajectory L1 of the striking implement derived in step S41 overlap at least a predetermined number of times (e.g., three times) (S42), and when the point of interest is determined not to overlap with movement trajectory L1 at least the predetermined number of times (No in S42), controller 140 switches from not presenting the object to presenting the object (S36). For example, object F1 indicating the point of interest and movement trajectory L1 of the striking implement overlapping in the image corresponds to movement trajectory L1 of the striking implement passes through a region of object F1, as illustrated in FIG. 15. For example, the movement trajectory of the striking implement may pass from one side of object F1 to the opposite side of object F1 as illustrated in FIG. 15, or may move back and forth within object F1. In other words, the number of times object F1 and movement trajectory L1 of the striking implement overlap may be the number of times movement trajectory L1 moves back and forth within object F1.

On the other hand, if the point of interest and movement trajectory L1 of the striking implement are determined to overlap at least the predetermined number of times (e.g., three times) (Yes in S42), controller 140 keeps the object not being presented (S37).

As described above, in Example 8 of the operations, when the point of interest (and more specifically, object F1 indicating the point of interest) and movement trajectory L1 of the striking implement do not overlap at least a predetermined number of times in the image, wearing terminal 100 switches from not presenting the object to presenting the object, and when the point of interest and movement trajectory L1 overlap at least the predetermined number of times, wearable terminal 100 keeps the object not being presented. Through this, when movement trajectory L1 of the striking implement used by the user and the point of interest (object F1) do not overlap at least a predetermined number of times, wearable terminal 100 determines that the user is able to accurately identify the sound in the predetermined band to a certain extent, and keeps the object not presented. When movement trajectory L1 of the striking implement used by the user and the point of interest (object F1) overlap at least the predetermined number of times, wearable terminal 100 determines that the user is not able to accurately identify the sound in the predetermined band, and presents the object. Wearable terminal 100 therefore switches the object from not being presented to being presented when the user's proficiency is lower than a predetermined level, which makes it possible to switch the display of the object according to the user's proficiency.

4. Effects, Etc.

As described above, wearable terminal 100 according to the embodiment is a wearable terminal that can be worn by a user, and includes: image obtainer 120 that obtains an image of a subject appearing in a field of view of the user; sound obtainer 121 that obtains sound information including a sound occurring in a vicinity of wearable terminal 100 and a direction of occurrence of the sound; specifier 142 that, based on the sound information and the image, specifies a point of interest, the point of interest being a location, in the subject, where a sound in a predetermined band included in the sound has occurred; and presenter 170 that presents, to the user, an object indicating the point of interest.

Through this, wearable terminal 100 presents the user with an object indicating the location in the subject where the sound in the predetermined band has occurred in the subject appearing in the user's field of view (called a "point of interest"), which makes it easier for the user to understand how to distinguish the sound in the predetermined band. Wearable terminal 100 can therefore present the knowledge of an auditory task to the user.

Wearable terminal 100 according to the embodiments may further include sound outputter 180 that outputs the sound having increased a sound pressure of the sound in the predetermined band.

Through this, wearable terminal 100 outputs the sound in the predetermined band at a high sound pressure, which makes it possible to effectively present knowledge of the auditory tasks to the user.

In wearable terminal 100 according to the embodiment, when the sound in the predetermined band is determined to have occurred in a same point of interest, presenter 170 may present the object indicating the same point of interest to the user in a different presentation format.

Through this, when the sound in the predetermined band is determined to have occurred again at the same point of interest, wearable terminal 100 presents the object to the user in a different presentation format, which makes it easier for the user to recognize the sound in the predetermined band occurring at the same point of interest. Wearable terminal 100 can therefore effectively present knowledge of auditory tasks to the user.

Wearable terminal 100 according to the embodiment may further include detector 141 that detects a specific action by the user, and based on the specific action detected by detector 141, presenter 170 may perform switching of a presentation format of the object indicating the point of interest, or may perform switching between presenting and not presenting the object indicating the point of interest.

Through this, wearable terminal 100 detects the specific action by the user and performs the switching of the presentation format of the object, or switching between presenting and not presenting, which makes it possible to adjust the presentation of the knowledge of the auditory task to the user according to the user's proficiency.

In wearable terminal 100 according to the embodiment, the specific action by the user may be an action of the user bringing two fingers together.

Through this, wearable terminal 100 can detect the action of the user bringing their fingers together as a specific action, which enables the user to operate wearable terminal 100 through simple actions while working.

In wearable terminal 100 according to the embodiment, detector 141 may further detect a line of sight of the user, and based on the line of sight of the user detected by detector 141, presenter 170 may perform the switching for the object indicating the point of interest when the line of sight of the user is directed at the point of interest.

Through this, wearable terminal 100 detects the user's line of sight and determines the point of interest to which the user's line of sight is directed as the target of the presentation switch, which makes it possible to switch the presentation of the object for the point of interest to which the user's line of sight is directed when the specific action is detected. Wearable terminal 100 can therefore switch the presentation of the object appropriately according to an instruction from the user.

In wearable terminal 100 according to the embodiment, in addition to the object indicating the point of interest currently specified by specifier 142, presenter 170 may present, to the user, an other object indicating an other point of interest specified before the point of interest in the field of view of the user, and when, based on the line of sight of the user, the line of sight of the user is determined to be directed to the other point of interest, sound outputter 180 may output a sound in the predetermined band occurring at the other point of interest.

Through this, wearable terminal 100 can output a sound in a predetermined band generated at the other point of interest when the user's line of sight is directed to the other point of interest, and teach the user the sound in the predetermined band.

In wearable terminal 100 according to the embodiment, detector 141 may further detect a distance between the subject and the user, and when the distance detected by detector 141 exceeds a first threshold, presenter 170 may present, to the user, all instances of the object indicating all instances of the point of interest for a set past period.

Through this, wearable terminal 100 can present, to the user, where, on the subject, all the points of interest specified over a set period in the past are located, for example, in response to detecting that the user is at least a set distance from the subject.

Wearable terminal 100 according to the embodiment may further include controller 140 that switches between presenting and not presenting the object by presenter 170; when the object is set to not be presented, controller 140 may keep the object not presented when a specific sign detected by detector 141 as the specific action is determined to at least partially overlap with the point of interest specified by specifier 142 in the image, and may switch from not presenting the object to presenting the object when the specific sign is determined not to overlap with the point of interest in the image.

Through this, wearable terminal 100 does not present the object when the user has successfully identified the sound in the predetermined band, but presents the object when the user is unable to identify the sound in the predetermined band, which makes it possible for the user to confirm whether their determination is correct each time. Wearable terminal 100 can therefore effectively train the user to identify sounds in the predetermined band.

In wearable terminal 100 according to the embodiment, when the specific sign is determined not to overlap with the point of interest a predetermined number of times consecutively, controller 140 may switch from not presenting the object to presenting the object.

Through this, wearable terminal 100 presents the object when the user is unable to identify the sound in the predetermined band for a predetermined number of times consecutively, which makes it possible to make a user who has undergone a certain amount of training aware that they have not successfully identified the sound in the predetermined band, for example.

In wearable terminal 100 according to the embodiment, when a reference point indicating a correct point of interest is prepared in advance, controller 140 may switch from not presenting the object to presenting the object when a percentage of times the specific sign is determined to overlap with the reference point is less than a second threshold.

Through this, wearable terminal 100 prepares a reference point indicating the correct point of interest in advance, and switches from not presenting the object to presenting the object when the user's proficiency in the auditory task is lower than a predetermined level. Wearable terminal 100 can therefore effectively train the user for the auditory task.

A presentation method according to the embodiment is a presentation method executed by wearable terminal 100 that can be worn by a user. The presentation method includes:

obtaining an image of a subject appearing in a field of view of the user; obtaining sound information including a sound occurring in a vicinity of wearable terminal 100 and a direction of occurrence of the sound; specifying, based on the sound information and the image, a point of interest, the point of interest being a location, in the subject, where a sound in a predetermined band included in the sound has occurred; and presenting, to the user, an object indicating the point of interest.

Through this, a device that executes the presentation method, such as wearable terminal 100, presents the user with an object indicating the location where the sound in the predetermined band has occurred in the subject appearing in the user's field of view (called a "point of interest"), and can therefore teach the user how to distinguish the sound in the predetermined band. The device that executes the presentation method, such as wearable terminal 100, can therefore present the knowledge of an auditory task to the user.

Embodiment 2

Next, Embodiment 2 will be described in detail with reference to the drawings.

1. Overview

Figure 16:
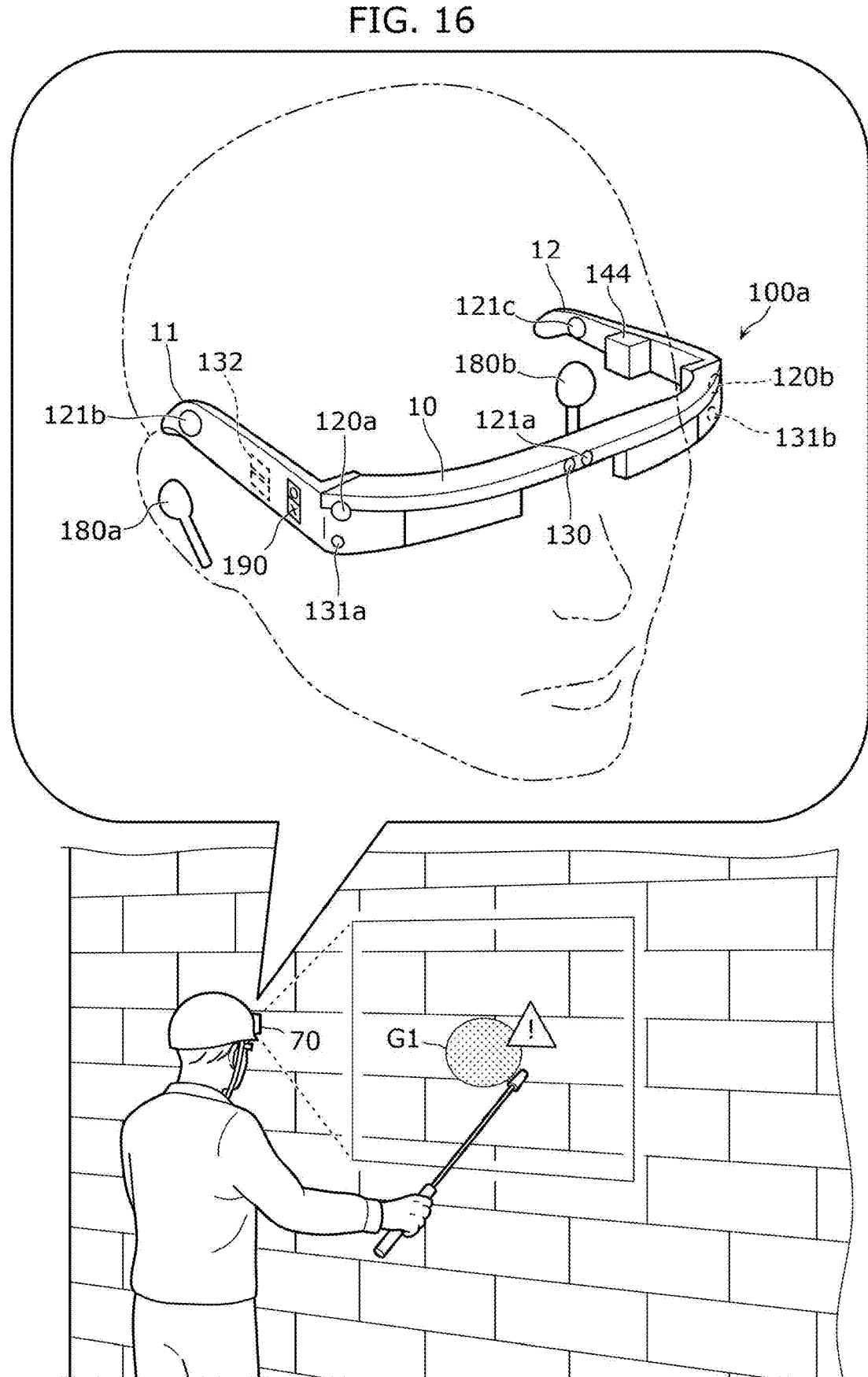
FIG. 16 is a diagram illustrating an overview of a presentation system according to Embodiment 2.
Figure 17:
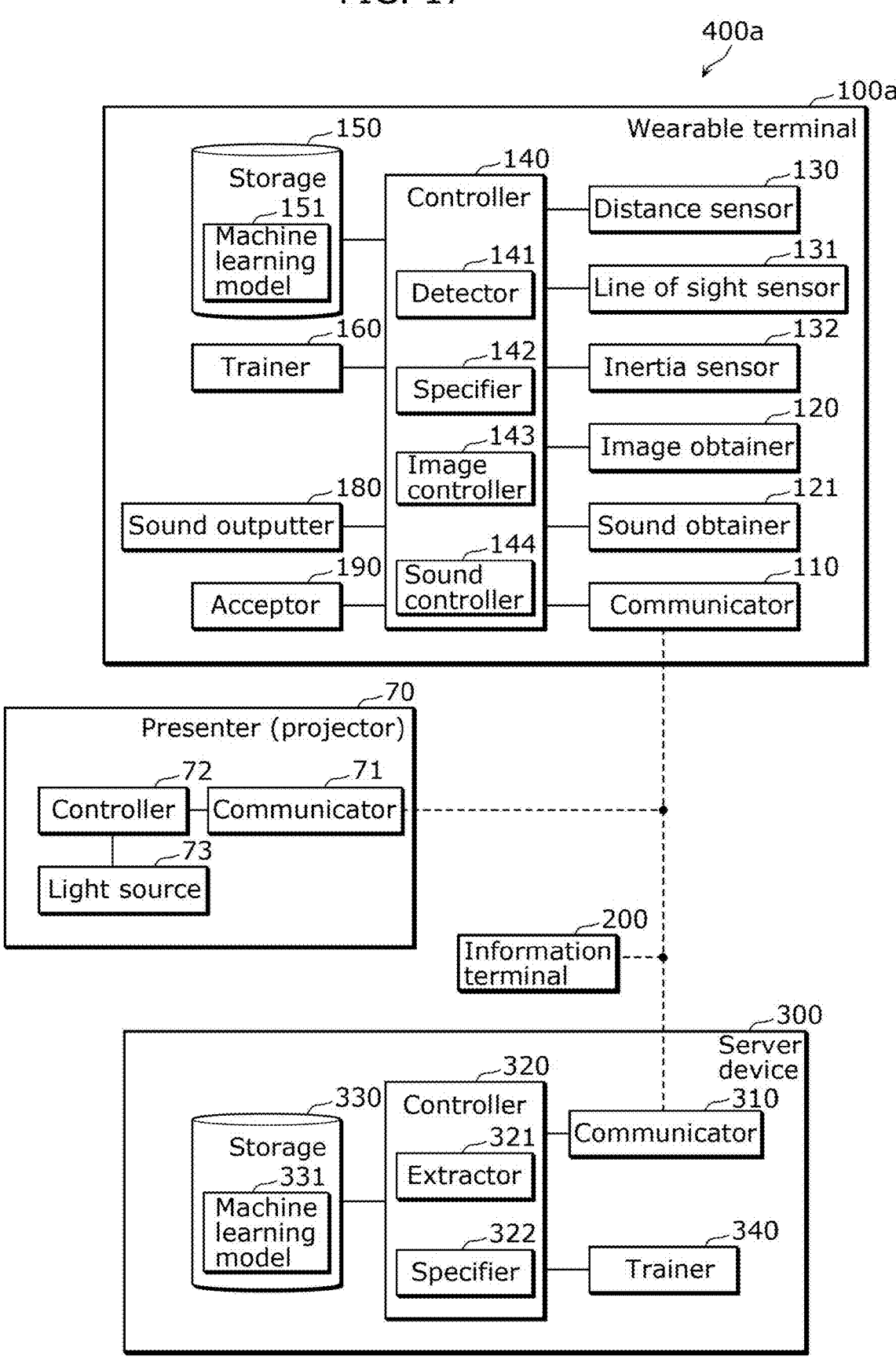
FIG. 17 is a block diagram illustrating an example of the configuration of the presentation system according to Embodiment 2.

First, an overview of a presentation system including a wearable terminal according to Embodiment 2 will be described with reference to FIG. 16. FIG. 16 is a diagram illustrating an overview of a presentation system according to Embodiment 2. FIG. 17 is a block diagram illustrating an example of the configuration of the presentation system according to Embodiment 2. In FIGS. 16 and 17, configurations that are the same as those illustrated in FIGS. 1 and 2 are given the same reference signs.

In Embodiment 1, wearable terminal 100 was an eyeglass-type or goggle-type wearable terminal provided with presenter 170. However, Embodiment 2 differs from Embodiment 1 in that wearable terminal 100*a* is communicatively connected to a projector attached to a helmet as presenter 70. The following will focus on points different from Embodiment 1, and descriptions of identical details will be simplified or omitted.

In presentation system 400*a* according to Embodiment 2, wearable terminal 100*a* does not include presenter 170, and operates in conjunction with the projector serving as presenter 70. In addition, in presentation system 400*a*, an image of object G1 is projected onto the subject from presenter 70.

2. Configuration

The configuration of presentation system 400*a* will be described next. As illustrated in FIGS. 16 and 17, presentation system 400*a* according to Embodiment 2 includes wearable terminal 100*a*, presenter 70, information terminal 200, and server device 300. Configurations different from those in Embodiment 1 will be described hereinafter.

2-1. Wearable Terminal

As illustrated in FIG. 16, wearable terminal 100*a* is, for example, an eyeglass-type wearable terminal. Wearable terminal 100*a* includes main body 10, right holding part 11, and left holding part 12.

Main body 10 does not include presenter 170 (see FIG. 1), but includes the two cameras 120*a* and 120*b* as image obtainer 120, right eye line of sight sensor 131*a* and left eye line of sight sensor 131*b* as line of sight sensor 131, and distance sensor 130.

In addition, for example, as sound obtainer 121, microphone 121*a* is disposed in main body 10; furthermore, microphone 121*b* and microphone 121*c* are disposed in right holding part 11 and left holding part 12, respectively. Although microphone 121*a* is disposed in main body 10 in FIG. 16, the configuration is not limited to this example, and two or more microphones may be disposed in main body 10, for example.

In addition, inertia sensor 132 and power buttons as acceptor 190 are provided in right holding part 11, and sound controller 144 that controls sound outputter 180, such as earphones 180*a* and 180*b*, is provided in left holding part 12.

The functional configuration of wearable terminal 100*a* will be described next with reference to FIG. 17. Wearable terminal 100*a* differs from that in Embodiment 1 in that presenter 170 is not included.

Communicator

Communicator 110 differs from communicator 110 according to Embodiment 1 in that wearable terminal 100*a* communicates with presenter 70 (a projector) in addition to information terminal 200 and server device 300. Communicator 110 may be connected to presenter 70 (a projector) by wireless communication such as Bluetooth (registered trademark). Communicator 110 has already been described in detail in Embodiment 1, and will therefore not be described here.

Controller

Controller 140 is different from that in Embodiment 1 in that based on the image and sound information obtained by image obtainer 120 and sound obtainer 121, and the sensing information such as the distance between the subject and the user, the user's line of sight, and user's body movement, and the like detected by distance sensor 130, line of sight sensor 131, and inertia sensor 132, controller 140 calculates a projection position of an object on the subject appearing in the user's field of view, and outputs a control signal pertaining to the projection of the object to presenter 70.

2-2. Presenter (Projector)

Presenter 70 is, for example, a projector, and may be attached to a helmet used by the user, as illustrated in FIG. 16. Presenter 70 includes, for example, communicator 71, controller 72, and light source 73. Presenter 70 projects, onto the subject appearing in the field of view of the user, an object indicating the point of interest specified by specifier 142 of wearable terminal 100*a*.

Communicator

Communicator 71 is communication circuitry (a communication module) for presenter 70 to communicate with wearable terminal 100*a*, but may also communicate with information terminal 200. Communicator 71 includes wireless communication circuitry (a wireless communication module) for communicating over a local communication network. The communication standard used by communicator 71 may be Bluetooth (registered trademark), for example.

Controller

Controller 72 performs information processing for controlling operations of presenter 70 in accordance with control signals from wearable terminal 100*a*. Specifically, controller 72 is a processor or microcomputer.

Light Source

Light source 73 is configured to emit light based on control information from controller 72. Light source 73 may be a laser light source, for example.

Other Embodiments

Although embodiments have been described thus far, the present disclosure is not limited to the foregoing embodiments.

Although implemented by a plurality of devices in the embodiments, for example, presentation systems 400 and 400*a* may instead be implemented as a single device. Additionally, if the systems are implemented by a plurality of devices, the constituent elements provided in presentation systems 400 and 400*a* may be distributed among the plurality of devices in any manner. Additionally, for example, a server device capable of communicating with presentation systems 400 and 400*a* may include a plurality of constituent elements included in controllers 140 and 320.

For example, the method through which the devices communicate with each other in the foregoing embodiment is not particularly limited. Additionally, a relay device (not shown) may relay the communication among the devices.

Additionally, processing executed by a specific processing unit in the foregoing embodiment may be executed by a different processing unit. Additionally, the order of multiple processes may be changed, and multiple processes may be executed in parallel.

Additionally, in the foregoing embodiments, the constituent elements may be implemented by executing software programs corresponding to those constituent elements. Each constituent element may be realized by a program executing unit such as a CPU or a processor reading out and executing a software program recorded into a recording medium such as a hard disk or semiconductor memory.

Each constituent element may be implemented by hardware. For example, each constituent element may be circuitry (or integrated circuitry). This circuitry may constitute a single overall circuit, or may be separate circuits. The circuitry may be generic circuitry, or may be dedicated circuitry.

The general or specific aspects of the present disclosure may be implemented by a system, a device, a method, an integrated circuit, a computer program, or a computer-readable recording medium such as a CD-ROM. These forms may also be implemented by any desired combination of systems, devices, methods, integrated circuits, computer programs, and recording media.

For example, the present disclosure may be implemented as a presentation method executed by a computer such as wearable terminals 100 and 100*a*, or as a program for causing a computer to execute such a presentation method. The present disclosure may also be realized as a program for causing a general-purpose computer to operate as wearable terminals 100 and 100*a* according to the foregoing embodiments. The present disclosure may be implemented as a non-transitory computer-readable recording medium in which the program is recorded.

Additionally, embodiments achieved by one skilled in the art making various conceivable variations on the embodiments, embodiments achieved by combining constituent elements and functions from the embodiments as desired within a scope which does not depart from the spirit of the present disclosure, and the like are also included in the present disclosure.

Supplementary Notes

Examples of inventions achieved from the content disclosed in the present specification will be given hereinafter, and effects and the like provided by the inventions will be described as well.

Technique 1

A wearable terminal that can be worn by a user, the wearable terminal including:

an image obtainer that obtains an image of a subject appearing in a field of view of the user;

a sound obtainer that obtains sound information including a sound occurring in a vicinity of the wearable terminal and a direction of occurrence of the sound;

a specifier that, based on the sound information and the image, specifies a point of interest, the point of interest being a location, in the subject, where a sound in a predetermined band included in the sound has occurred; and a presenter that presents, to the user, an object indicating the point of interest.

Effects of Technique 1

Such a wearable terminal presents the user with an object indicating the location where the sound in the predetermined band has occurred in the subject appearing in the user's field of view (called a "point of interest"), which makes it easier for the user to understand how to distinguish the sound in the predetermined band. The wearable terminal can therefore present the knowledge of an auditory task to the user.

Technique 2

The wearable terminal according to Technique 1, further including:

a sound outputter that outputs the sound having increased a sound pressure of the sound in the predetermined band.

Effects of Technique 2

Such a wearable terminal outputs the sound in the predetermined band at a high sound pressure, which makes it possible to effectively present knowledge of the auditory tasks to the user.

Technique 3

The wearable terminal according to Technique 2, wherein when the sound in the predetermined band is determined to have occurred in a same point of interest, the presenter presents the object indicating the same point of interest to the user in a different presentation format.

Effects of Technique 3

When the sound in the predetermined band is determined to have occurred again at the same point of interest, such a wearable terminal presents the object to the user in a different presentation format, which makes it easier for the user to recognize the sound in the predetermined band occurring at the same point of interest. The wearable terminal can therefore effectively present knowledge of auditory tasks to the user.

Technique 4

The wearable terminal according to Technique 2 or 3, further including:

a detector that detects a specific action by the user, wherein based on the specific action detected by the detector, the presenter performs switching of a presentation format of the object indicating the point of interest, or performs switching between presenting and not presenting the object indicating the point of interest.

Effects of Technique 4

Such a wearable terminal detects the specific action by the user and performs the switching of the presentation format of the object, or switching between presenting and not presenting, which makes it possible to adjust the presentation of the knowledge of the auditory task to the user according to the user's proficiency.

Technique 5

The wearable terminal according to Technique 4, wherein the specific action by the user is an action of the user bringing two fingers together.

Effects of Technique 5

Such a wearable terminal can detect the action by the user bringing their fingers together as a specific action, which enables the user to operate the wearable terminal through simple actions while working.

Technique 6

The wearable terminal according to Technique 4 or 5, wherein the detector further detects a line of sight of the user, and based on the line of sight of the user detected by the detector, the presenter performs the switching for the object indicating the point of interest when the line of sight of the user is directed at the point of interest.

Effects of Technique 6

Such a wearable terminal detects the user's line of sight and determines the point of interest to which the user's line of sight is directed as the target of the presentation switch, which makes it possible to switch the presentation of the object for the point of interest to which the user's line of sight is directed when the specific action is detected. The wearable terminal can therefore switch the presentation of the object appropriately according to an instruction from the user.

Technique 7

The wearable terminal according to Technique 6, wherein in addition to the object indicating the point of interest currently specified by the specifier, the presenter presents, to the user, an other object indicating an other point of interest specified before the point of interest in the field of view of the user, and when, based on the line of sight of the user, the line of sight of the user is determined to be directed to the other point of interest, the sound outputter outputs a sound in the predetermined band occurring at the other point of interest.

Effects of Technique 7

Such a wearable terminal can output a sound in a predetermined band generated at the other point of interest when the user's line of sight is directed to the other point of interest, and teach the user the sound in the predetermined band.

Technique 8

The wearable terminal according to any one of Techniques 4 to 7, wherein the detector further detects a distance between the subject and the user, and when the distance detected by the detector exceeds a first threshold, the presenter presents, to the user, all instances of the object indicating all instances of the point of interest for a set past period.

Effects of Technique 8

Such a wearable terminal can present, to the user, where, on the subject, all the points of interest specified over a set period in the past are located, for example, in response to detecting that the user is at least a set distance from the subject.

Technique 9

The wearable terminal according to any one of Techniques 4 to 8, further including:

a controller that switches between presenting and not presenting the object by the presenter, wherein when the object is set to not be presented, the controller keeps the object not presented when a specific sign detected by the detector as the specific action is determined to at least partially overlap with the point of interest specified by the specifier in the image, and switches from not presenting the object to presenting the object when the specific sign is determined not to overlap with the point of interest in the image.

Effects of Technique 9

Such a wearable terminal does not present the object when the user has successfully identified the sound in the predetermined band, but presents the object when the user is unable to identify the sound in the predetermined band, which makes it possible for the user to confirm whether their determination is correct each time. The wearable terminal can therefore effectively train the user to identify sounds in the predetermined band.

Technique 10

The wearable terminal according to Technique 9, wherein when the specific sign is determined not to overlap with the point of interest a predetermined number of times consecutively, the controller switches from not presenting the object to presenting the object.

Effects of Technique 10

Such a wearable terminal presents the object when the user is unable to identify the sound in the predetermined band for a predetermined number of times consecutively, which makes it possible to make a user who has undergone a certain amount of training aware that they have not successfully identified the sound in the predetermined band, for example.

Technique 11

The wearable terminal according to Technique 9, wherein when a reference point indicating a correct point of interest is prepared in advance, the controller switches from not presenting the object to presenting the object when a percentage of times the specific sign is determined to overlap with the reference point is less than a second threshold.

Effects of Technique 11

Such a wearable terminal prepares a reference point indicating the correct point of interest in advance, and switches from not presenting the object to presenting the object when the user's proficiency in the auditory task is lower than a predetermined level. The wearable terminal can therefore effectively train the user for the auditory task.

Technique 12

The wearable terminal according to any one of Techniques 4 to 10, further including:

a controller that switches between presenting and not presenting the object by the presenter, wherein when the object is set to not be presented, the controller keeps the object not presented when a movement trajectory, detected by the detector, of a striking implement used by the user for sonically inspecting the subject overlaps with the point of interest specified by the specifier in the image fewer than a predetermined number of times, and switches from not presenting the object to presenting the object when the movement trajectory of the striking implement overlaps with the point of interest in the image at least a predetermined number of times.

Effects of Technique 12

When the movement trajectory of the striking implement used by the user and the point of interest do not overlap at least a predetermined number of times, such a wearable terminal determines that the user is able to accurately identify the sound in the predetermined band to a certain extent, and keeps the object not presented. When the movement trajectory of the striking implement used by the user and the point of interest overlap at least a predetermined number of times, the wearable terminal determines that the user is not able to accurately identify the sound in the predetermined band, and presents the object. The wearable terminal therefore switches the object from not being presented to being presented when the user's proficiency is lower than a predetermined level, which makes it possible to switch the display of the object according to the user's proficiency.

INDUSTRIAL APPLICABILITY

According to the present disclosure, the knowledge of a skilled worker can be presented to a worker required to perform an auditory task, which makes it possible to more effectively support the worker in building their technique.

The invention claimed is:

1. A wearable terminal that can be worn by a user, the wearable terminal comprising:

an image obtainer that obtains an image of a subject appearing in a field of view of the user;

a sound obtainer that obtains sound information including a sound occurring in a vicinity of the wearable terminal and a direction of occurrence of the sound;

a specifier that, based on the sound information and the image, specifies a point of interest, the point of interest being a location, in the subject, where a sound in a predetermined band included in the sound has occurred;

a presenter that presents, to the user, an object indicating the point of interest;

a sound outputter that outputs the sound having increased a sound pressure of the sound in the predetermined band; and a detector that detects a line of sight of the user, wherein the predetermined band is a frequency band in which a sound is generated in accordance with a condition of the subject, in addition to the object indicating the point of interest currently specified by the specifier, the presenter presents, to the user, a second object indicating a second point of interest specified before the point of interest in the field of view of the user, and when, based on the line of sight of the user, the line of sight of the user is determined to be directed to the second point of interest, the sound outputter outputs a second sound in the predetermined band occurring at the second point of interest.

2. The wearable terminal according to claim 1, wherein when the sound in the predetermined band is determined to have occurred in a same point of interest, the presenter presents the object indicating the same point of interest to the user in a different presentation format.

3. The wearable terminal according to claim 1, wherein the detector further detects a specific action by the user, and based on the specific action detected by the detector, the presenter performs switching of a presentation format of the object indicating the point of interest, or performs switching between presenting and not presenting the object indicating the point of interest.

4. The wearable terminal according to claim 3, wherein the specific action by the user is an action of the user bringing two fingers together.

5. The wearable terminal according to claim 3, wherein, based on the line of sight of the user detected by the detector, the presenter performs the switching for the object indicating the point of interest when the line of sight of the user is directed at the point of interest.

6. The wearable terminal according to claim 3, wherein the detector further detects a distance between the subject and the user, and when the distance detected by the detector exceeds a first threshold, the presenter presents, to the user, all instances of the object indicating all instances of the point of interest for a set past period.

7. The wearable terminal according to claim 3, further comprising:

a controller that switches between presenting and not presenting the object by the presenter, wherein when the object is set to not be presented, the controller keeps the object not presented when a specific sign detected by the detector as the specific action is determined to at least partially overlap with the point of interest specified by the specifier in the image, and switches from not presenting the object to presenting the object when the specific sign is determined not to overlap with the point of interest in the image.

8. The wearable terminal according to claim 7, wherein when the specific sign is determined not to overlap with the point of interest a predetermined number of times consecutively, the controller switches from not presenting the object to presenting the object.

9. The wearable terminal according to claim 7, wherein when a reference point indicating a correct point of interest is prepared in advance, the controller switches from not presenting the object to presenting the object when a percentage of times the specific sign is determined to overlap with the reference point is less than a second threshold.

10. The wearable terminal according to claim 3, further comprising:

a controller that switches between presenting and not presenting the object by the presenter, wherein when the object is set to not be presented, the controller keeps the object not presented when a movement trajectory, detected by the detector, of a striking implement used by the user for sonically inspecting the subject overlaps with the point of interest specified by the specifier in the image fewer than a predetermined number of times, and switches from not presenting the object to presenting the object when the movement trajectory of the striking implement overlaps with the point of interest in the image at least a predetermined number of times.

11. A presentation method executed by a wearable terminal that can be worn by a user, the presentation method comprising:

obtaining an image of a subject appearing in a field of view of the user;

obtaining sound information including a sound occurring in a vicinity of the wearable terminal and a direction of occurrence of the sound;

specifying, based on the sound information and the image, a point of interest, the point of interest being a location, in the subject, where a sound in a predetermined band included in the sound has occurred;

presenting, to the user, an object indicating the point of interest;

outputting the sound having increased a sound pressure of the sound in the predetermined band; and detecting a line of sight of the user, wherein the predetermined band is a frequency band in which a sound is generated in accordance with a condition of the subject, in addition to the object indicating the point of interest currently specified in the specifying, the presenting includes presenting, to the user, a second object indicating a second point of interest specified before the point of interest in the field of view of the user, and when, based on the line of sight of the user, the line of sight of the user is determined to be directed to the second point of interest, the outputting includes outputting a second sound in the predetermined band occurring at the second point of interest.

12. A non-transitory computer-readable recording medium having recorded thereon a program for causing a computer to execute the presentation method according to claim 11.

* * * * *